US005681140A

United States Patent [19]

Christenson

[11] Patent Number: 5,681,140

[45] Date of Patent: Oct. 28, 1997

[54] MULTIPLE COMPARTMENT BODY FOR WASTE MATERIALS

[75] Inventor: Ronald E. Christenson, Parsons, Tenn.

[73] Assignee: McNeilus Truck and Manufacturing, Inc., Dodge Center, Minn.

[21] Appl. No.: 638,358

[22] Filed: Apr. 26, 1996

Related U.S. Application Data

[63] Continuation of Ser. No. 389,097, Feb. 15, 1995, abandoned.

[51] Int. Cl.[6] .................... B65G 3/14

[52] U.S. Cl. .................... 414/525.6; 414/406; 414/512; 414/525.6

[58] Field of Search .................... 414/406, 409, 414/525.2, 525.55, 525.6, 512, 525.5

[56] References Cited

U.S. PATENT DOCUMENTS

| | | | |
|---|---|---|---|
| D. 329,829 | 9/1992 | Mangino et al. | D12/15 |
| 3,828,956 | 8/1974 | Dubo . | |
| 3,865,260 | 2/1975 | Wieschel et al. | 414/517 |
| 3,921,389 | 11/1975 | Herpich | 414/406 |
| 4,113,125 | 9/1978 | Schiller | 414/406 |
| 4,456,414 | 6/1984 | Williams | 410/80 |
| 4,576,540 | 3/1986 | Derain | 414/511 |
| 4,909,564 | 3/1990 | Pfeifer et al. | 296/184 |
| 4,986,716 | 1/1991 | Winter | 414/409 |
| 5,035,563 | 7/1991 | Mezey | 414/409 |
| 5,044,861 | 9/1991 | Kirchhoff et al. | 414/332 |
| 5,071,303 | 12/1991 | Carson | 414/21 |
| 5,078,567 | 1/1992 | Lombardo | 414/525.6 |
| 5,094,582 | 3/1992 | Molzhon | 414/406 |
| 5,116,184 | 5/1992 | Pellegrini | 414/406 |
| 5,122,025 | 6/1992 | Glomski | 414/525.6 X |
| 5,163,805 | 11/1992 | Mezey | 414/786 |
| 5,205,698 | 4/1993 | Mezey | 414/406 |
| 5,222,853 | 6/1993 | Carson | 414/408 |
| 5,252,020 | 10/1993 | Kinney et al. | 414/346 |
| 5,275,522 | 1/1994 | Garrett, Jr. et al. | 414/407 |
| 5,288,196 | 2/1994 | Horning et al. | 414/407 |
| 5,303,841 | 4/1994 | Mezey | 220/555 |
| 5,316,430 | 5/1994 | Horning et al. | 414/407 |
| 5,342,164 | 8/1994 | Kinney et al. | 414/786 |
| 5,344,273 | 9/1994 | Radlein | 414/406 X |
| 5,417,540 | 5/1995 | Cox | 414/475 |
| 5,427,496 | 6/1995 | Ratledge, Jr. et al. | 414/409 X |
| 5,458,452 | 10/1995 | Pellegrini | 414/406 |
| 5,474,413 | 12/1995 | Georg | 414/408 |
| 5,484,246 | 1/1996 | Horning et al. | 414/409 |

FOREIGN PATENT DOCUMENTS

| | | | |
|---|---|---|---|
| 0647724 | 9/1993 | Australia | 414/408 |
| 0314238 | 5/1989 | European Pat. Off. | 414/406 |
| 0492699 | 7/1992 | European Pat. Off. | 414/525.2 |
| 3537546 | 4/1987 | Germany | 414/409 |
| 9405570 | 3/1994 | WIPO | 414/512 |

*Primary Examiner*—James W. Keenan

*Attorney, Agent, or Firm*—Haugen And Nikolai, P.A.

[57] ABSTRACT

A multi-compartment vehicle body for collecting, packing, hauling and unloading refuse material including recyclable materials is disclosed, including a truck body enclosing a material-receiving volume which includes a horizontal wall within the volume which divides the volume into separate upper and lower storage body compartments. A longitudinally-spaced loading opening at the top of the body contains separate openings being in continuous communication each with one of the separate compartments. Preferably, non-recyclable refuse is stored in the lower compartment. The truck body includes a primary compacting system associated with one of said compartments for compacting non-recyclable materials and an auxiliary compacting system linked to the primary compacting system for compacting recyclable materials. The auxiliary compacting system includes a device for limiting the force of compaction against the recyclable material such that it will not exceed a predetermined maximum regardless of the force applied to the non-recyclable refuse material. Embodiments of up to six separate longitudinal compartments are illustrated.

20 Claims, 26 Drawing Sheets

MULTIPLE COMPARTMENT BODY FOR WASTE MATERIALS

This is a Continuation of application Ser. No. 08/389,097, filed on Feb. 15, 1995, now abandoned.

BACKGROUND OF THE INVENTION

1. Field of the Invention

The present invention relates generally to vehicles for collecting, packing, hauling and unloading refuse materials including recyclable materials; more particularly, the invention is directed to refuse vehicles wherein the refuse hold or body is divided into a plurality of separate dedicated compartments capable of coordinated operation in handling a plurality of recyclable and waste materials.

2. Related Art

The business of collecting, hauling and disposing of waste products is becoming increasingly complex. This includes a proliferation of the types of materials collected for recycling in addition to refuse collected for landfill disposal. It is preferable that recyclable materials be sorted or separated at the point of origin and for that separation to be continued through the collection process. To this end, many specialty vehicles have been provided with a plurality of separated volumes or compartments each dedicated to the accumulation of a specific species of recyclable material; for example, glass, aluminum, plastic and paper might each occupy one of four compartments in such a truck body. Such a vehicle, while ideal from the standpoint of maintaining integrity of the load of recyclables, represents a relatively inefficient collection system as it requires point of origin separation of all recyclable and necessitates a separate vehicle dedicated to address non-recyclable waste materials.

Other vehicles have been proposed that assimilate refuse materials in a smaller number of compartments which allow for acommingled or partially commingled condition respecting recyclable materials. Horning et al, in U.S. Pat. No. 5,316,430, disclose a recycle hauling apparatus including a truck body divided into two separate compartments by a horizontal wall mounted within the truck body of the side-loading hauler. Openings for loading the upper and lower compartments are provided in a fore and aft arrangement in the front portion of the refuse body. The body is designed to accept paper recyclables fore and commingled glass, aluminum and plastic materials aft. The forward opening is in continuous communication with the lower compartment only and the aft opening is in continuous communication with the upper compartment only. Separate doors close the rear of each compartment with the door closing the upper compartment being spaced rearward of the door closing the lower compartment and extending over the entire rear of the truck body such that material filing the upper compartment spills down and occupies space behind the lower compartment prior to discharge. Another device is described in Horning et al U.S. Pat. No. 5,316,430 which may utilize a movable dividing wall or panel between upper and lower compartments.

Truck bodies having side-to-side separation rather than upper and lower and which can be manufactured as either front loading or side loading vehicles are depicted in U.S. Pat. Nos. 5,303,841; 5,205,698; and 5,035,563, 5,163,805 to Mezey. The Mezey references illustrate a front loading, multi-compartment refuse vehicle with side-by-side compartments in conjunction with a corresponding side-by-side compartmentalized container. Such a side-by-side configuration, while convenient for loading, may lead to serious load imbalance and vehicle stabilization problems if the heavier, compacted waste materials are concentrated on one side of the truck body. Other multiple compartment bodies are shown in U.S. Pat. Nos. 5,122,025; 5,094,582 and 5,078,567.

There remains a need, however, for a multi-compartment truck body apparatus which can accommodate segregated or commingled recyclables with or without separated non-recycled waste materials in a front or side loading truck body which compensates for the inability of formed glass articles to withstand the high compressive forces normally associated with the compaction of disposable refuse even though the glass can be commingled with other recyclable materials such as aluminum and plastic containers. There is also a need for a multi-compartment truck body of the front-loading type which is configured to accomplish top and bottom separation in the manner of separating recyclable materials or recyclable and non-recyclable materials. There is also a need to provide a multi-compartment truck body including provision for the compaction of both disposable and recyclable materials which can accomplish this utilizing a single direct powered packing mechanism. This needs to be accomplished wile minimizing the breakage of glass and formation of gluts of compacted materials such as aluminum cans in the body of the compartmentalized collection vehicle such that emptying of the vehicle becomes difficult.

Accordingly, it is a primary object of the invention to provide a compartmentalized collection vehicle that improves the collection and hauling of mixed (compactable/non-compactable) loads, particularly loads with commingled recyclables.

Another object of the invention is to provide a system for compacting mixed loads including non-compactable recyclables in a compartmentalized collection vehicle which provides for variation in compaction forces between comparable rubbish and recyclables and non-compactable recyclables that minimizes glass breakage and glut formation.

Yet another object of the invention is to provide a system for compacting mixed loads including recyclables in a compartmentalized collection vehicle which provides for variation in compaction forces between the rubbish and recyclables that minimizes glass breakage and glut formation operated by a single ram system.

It is still another object of the present invention to provide a waste collection system as described above in which the compartmentalized collection vehicle is either a front loading system or a side loading system.

It is a further object of the present invention to provide a compartmented collection vehicle in which the number of compartments and the compacting systems can be tailored to the desired end use.

Other objects and advantages of the invention will occur to those skilled in the art upon familiarization with the specification, drawings and claims contained herein.

SUMMARY OF THE INVENTION

In view of the foregoing, the present invention provides an improved multi-compartmented collection vehicle which overcomes problems associated with prior vehicles and includes a system for directing the refuse from a multi-compartmentalized collection box or hopper and directing same into the proper compartment in the collection vehicle. One or more compacting mechanisms for refuse also operate auxiliary compacting systems, possible of a different maximum applied forces associated with one or more recyclable compartments. The compacting force of each auxiliary ramming system can be tailored to the particular material being compacted and need not be that of a main driving ram.

In accordance with the invention, any number of compartments may be used, and as many or as few compaction systems, i.e., a lower refuse or highly compactable recyclable compacting panel system may be linked to a single upper recyclable compacting panel system as a follower system to operate in a truck body having a single upper and a single lower compartment or in a truck body having a plurality of upper and/or lower compartments separated by telescoping divider panels or walls connected with the relevant compacting panel. While not preferred, it is understood that the recyclables can occupy the lower, and the compactable material, the upper section or sections of the truck.

The compaction system includes one or more high pressure main or primary compaction systems for compacting disposable refuse each of which is linked to an auxiliary or compliant compacting system for compacting segregated or mixed recyclables. The linkage between a primary and an auxiliary compacting system preferably provides for a force application differential such that while full compaction force is applied to the disposable refuse, the force applied to the recyclables is limited. This is accomplished by a spring biased telescoping the linkage in one embodiment. In another embodiment, a compliant fluid cylinder system operates a telescoping tube linkage. A hydraulic system that allows pressure relief and yet allows for anti-cavitation protection for the compliant cylinders is also provided.

An embodiment is shown in which a direct linkage is used for a situation in which lower force from the auxiliary compaction system is not necessary. Embodiments are also illustrated for from two to six compartments and from one to three main compaction systems, it being understood that any number can be used. The multi-compartmental vehicle body of the invention may be incorporated into either a front loading or a side loading vehicle. It should be understood that any compatible method of loading can be combined with the multi-compartmental vehicle body, as the method of loading is not critical.

BRIEF DESCRIPTION OF THE DRAWINGS

In these drawings, where like numerals are utilized to designate like parts throughout the same.

DETAILED DESCRIPTION

The compartmented collection vehicle body system or design of the invention is generally applicable to front and side loading refuse vehicles and is characterized by a continuous, permanent, horizontal divider separating one or more upper from one or more lower horizontal compartments with the number and location of the compartments being variable and possibly commensurate with locations of the loads in separated boxes to be dumped into segregated or separated load hoppers. The lower storage body includes one or more fluid-operated rams or compaction panels dedicated to high force compaction of non-recyclable waste materials. The lower compaction systems operate auxiliary upper ram devices which are mechanically linked. Compressive forces exerted by the upper or linked auxiliary compacting devices can be adjusted in any of several ways to compensate for the requirement to avoid breakage of recyclable glass materials, and to prevent gluts of compacted plastic or aluminum which make it difficult to unload the affected truck body compartment.

Figure 1:
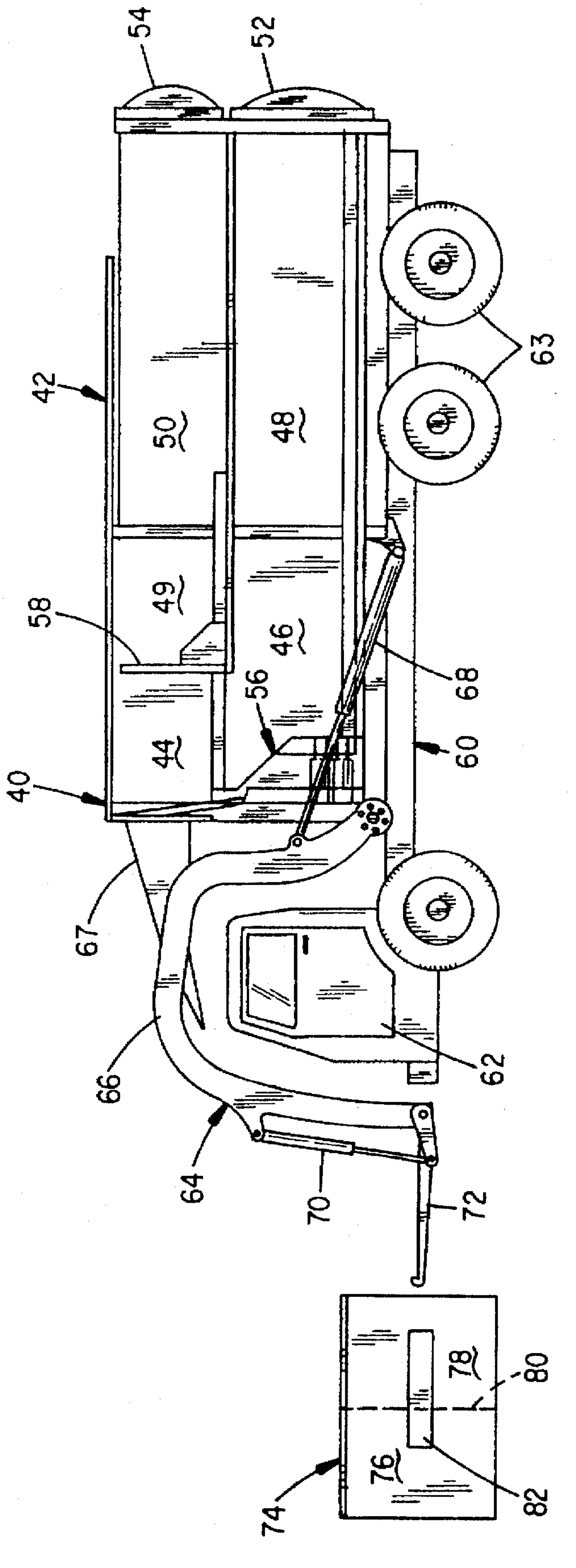
FIG. 1 is a side view of a compartmented collection vehicle of the front loading variety addressing a divided container to be lifted.

In accordance with the drawings, several embodiments will now be described in detail. FIG. 1 depicts the side view of a front loading refuse hauling vehicle, generally at 40, with the sides removed to show the interior details. The refuse hauling body includes a refuse receiving area which is a chamber generally divided into a forward section 44 which connects with a lower loading hopper 46 and a lower storage body 48. An upper loading hopper 49 has a receiving opening rearward of the lower loading hopper 46 and connected to an upper storage body 50. Lower storage body 48 and upper storage body 50 are provided, respectively, with top hinged arcuate tailgates 52 and 54. These tailgates are designed to absorb the forces of compaction and maintain a pressurized load when closed. They swing open to allow discharge of the refuse in the corresponding storage body. Each of the loading hoppers is provided with packing ram mechanism including a lower panel, generally at 56, and an upper panel, generally at 58.

The body 42 is attached to a frame or chassis 60 which also carries a cab section 62 and wheels 63. A lift and dump mechanism, shown generally at 64, is provided to empty refuse containers into the receiving hoppers 44 and 49. The truck is shown about to address a refuse/recycle box separated into a forward compartment 76 and rear compartment 78 by a vertical wall 80. The lift and dump mechanism contains identical devices addressing either side of the vehicle, one side being depicted in FIG. 1 including a heavy lift arm 66 which operate outside cab protector 67, lift and dump hydraulic cylinders 68 and 70 and lifting fork 72. Lift handles designed to be addressed by the forks 72 are shown at 82.

Figure 2:
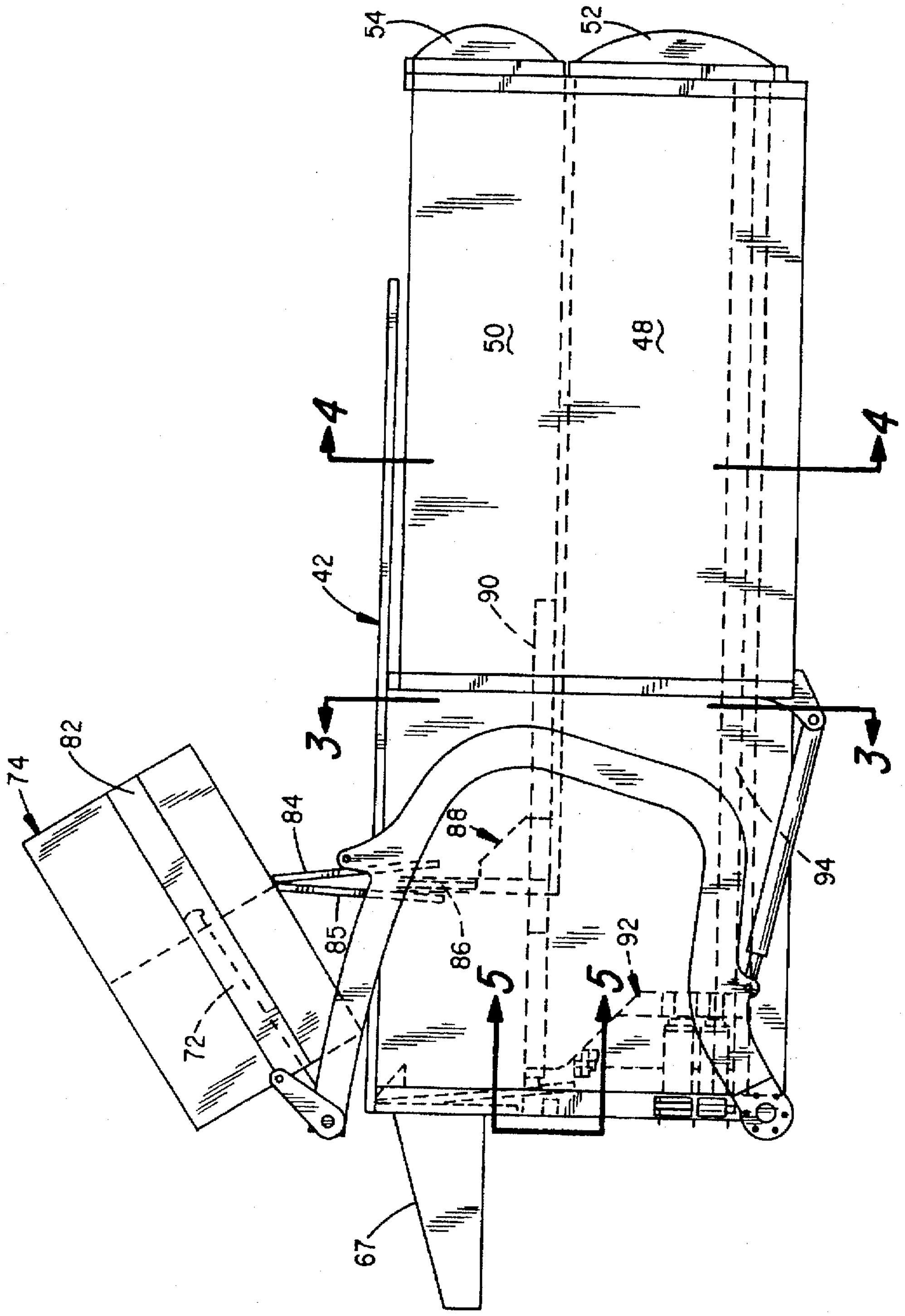
FIG. 2 depicts an enlarged partial view of the truck body of the vehicle of FIG. 1 with a divided container in the dump position.

FIG. 2 depicts a slightly enlarged version of the truck body 42 of FIG. 1 in side view with the divided refuse box 74 raised above the loading hoppers by the lifting forks 72 received in the handling pockets 82 in a well-known manner. Two separate covers 84 and 85 used to cover the forward and rearward portions of the divided container 74 open on either side of panel 86 to assure proper separation of the discharging materials between the upper and lower loading hoppers. Of course the top cover (not shown) is in the open position. Pictured also are an upper compaction panel 88 which rides in an upper guide track 90 and a lower compaction panel 92 which rides in a corresponding lower guide track 94 as will be described.

Figure 3:
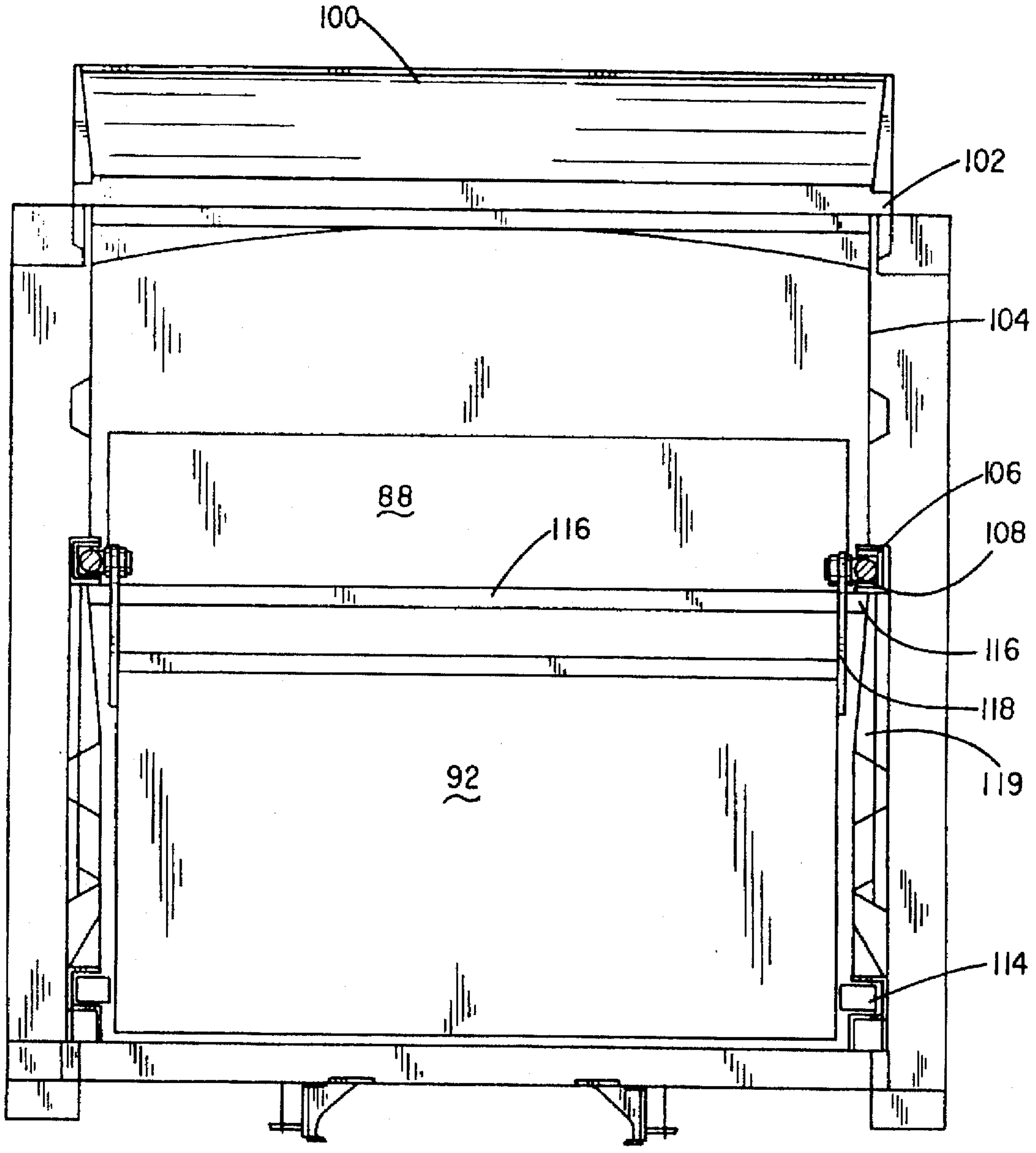
FIG. 3 is an enlarged end sectional view of the refuse vehicle body of FIG. 2 taken substantially along lines 3—3 of FIG. 2.

FIG. 3 depicts a sectional view along 3—3 of FIG. 2 which view also depicts a truck windscreen 100 and the vehicle body top cover track is shown at 102, the top being in the opened position behind the line of the sectional view. In addition, upper hopper sides as at 104 and upper panel guide tracks 106 together with upper compactor/lower compactor connecting link system (solid or compliant spring or hydraulic cylinder) is shown at 108. The lower panel supports are shown at 114 in track guides 94. The dividing panel between the upper and lower track body compartments, otherwise known as the upper loading hopper floor, is depicted at 116. The connecting link system 108 is connected with the lower panel mechanism with lower linking levers 118.

Figure 4:
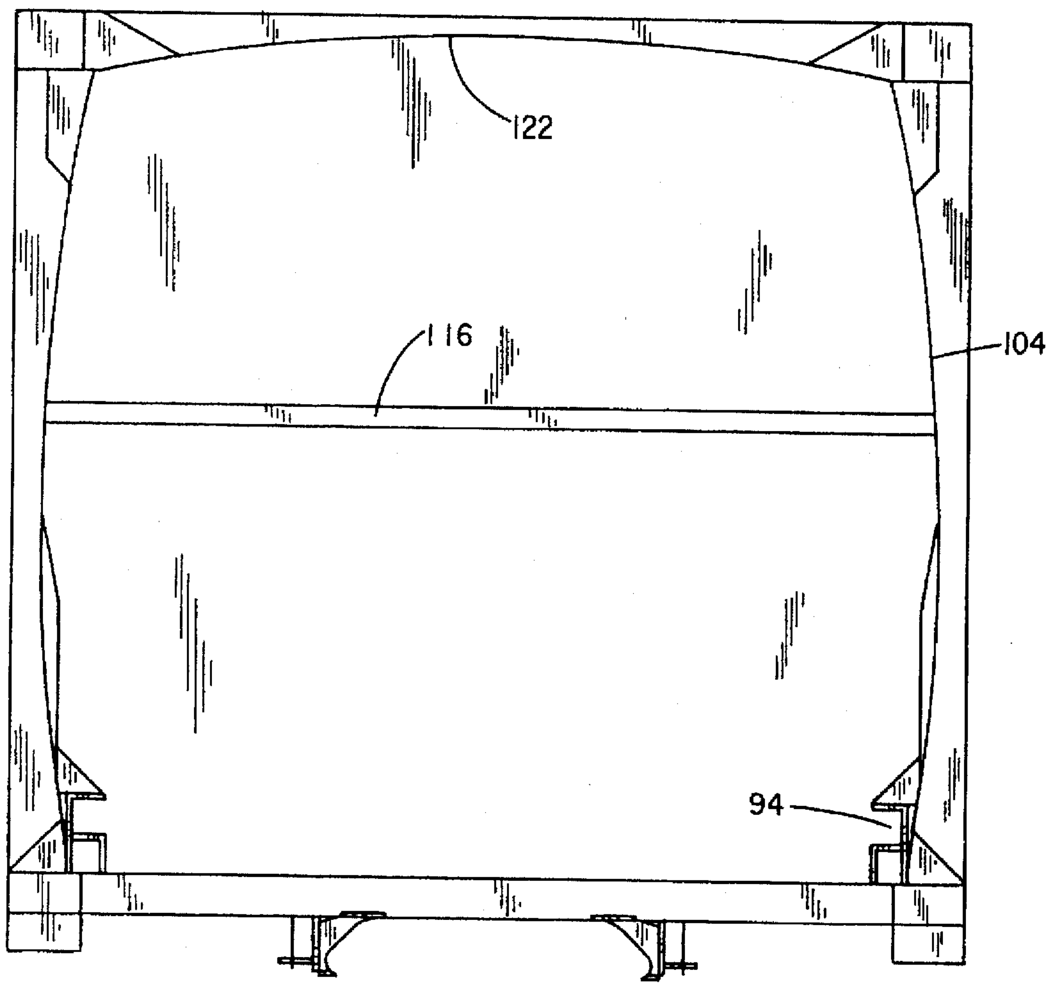
FIG. 4 is an enlarged sectional view of the refuse truck body of FIG. 2 taken substantially along lines 4—4 of FIG. 2.

FIG. 4 depicts a somewhat different end view, looking rearward from the upper and lower storage bodies behind the compaction mechanisms along lines 4—4 of FIG. 2. This view shows the divided panel or upper loading hopper floor 116 as a permanently mounted structure spanning between the sides 104. The lower panel guide rails or guide tracks 94 are clearly shown as is the generally arcuate shape of the upper panel at 122. The upper and lower surfaces of the divider panel 116 have relatively smooth surfaces to reduce compacting friction.

Figure 5:
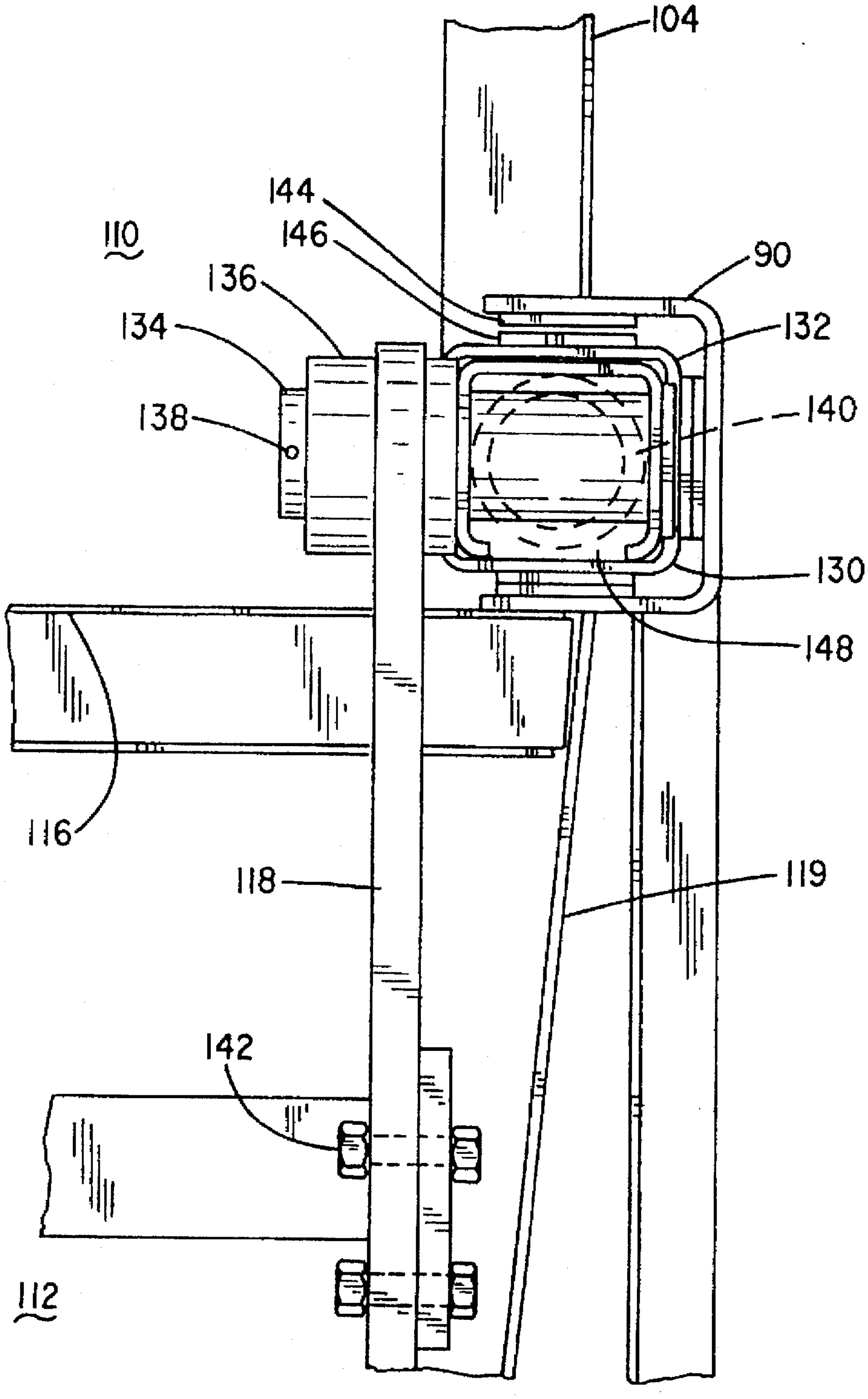
FIG. 5 is a greatly enlarged fragmentary cross-sectional view of a compliant linkage associated with an auxiliary compacting mechanism taken substantially along lines 5—5 of FIG. 2.

FIG. 5 is a sectional view taken along lines 5—5 of FIG. 2 depicting a greatly enlarged view of a complaint linkage system which links the operation of the upper compaction panel to that of the lower, controlling compaction panel in accordance with the invention. The compliant linkage system includes a pair of identical system each of which is situated within an upper panel guide rail 90 and includes an inner telescoping linkage tube 130 that floats inside of an outer telescoping linkage tube 132. A pivot pin 134 is connected through an opening in the inner telescopic linkage tube 130 and rides in a sleeve member 136 retained as by a cotter pin 138. The sleeve 136 is affixed to the inner lower linkage lever 118 so that the lower linkage lever connection is free to rotate about the pivot pin 134 as it produces reciprocal motion of the pin 134 and the inner telescoping linkage tube 130. A panel operating means or forcing means 140 which may be in the form of an hydraulic cylinder (FIG. 12) or compliant spring linkage member (FIG. 8) has a forward end connected to the inner telescoping linkage tube 130 and an aft end connected to the outer telescoping linkage tube 132 in a manner that produces expansion or retraction of the telescopic tube system based on relative external/internal forces. The lower linkage lever connects to the lower compaction panel assembly as by being bolted at 142 and pairs of oppositely disposed wear liners or wear bars 144 and 146, respectively, attached to the upper compactor rail 90 and the outer wear bar 132, respectively, are provided to reduce wear on the rail and outer tube caused by repeated reciprocal motion of the outer tube 132.

Figure 8:
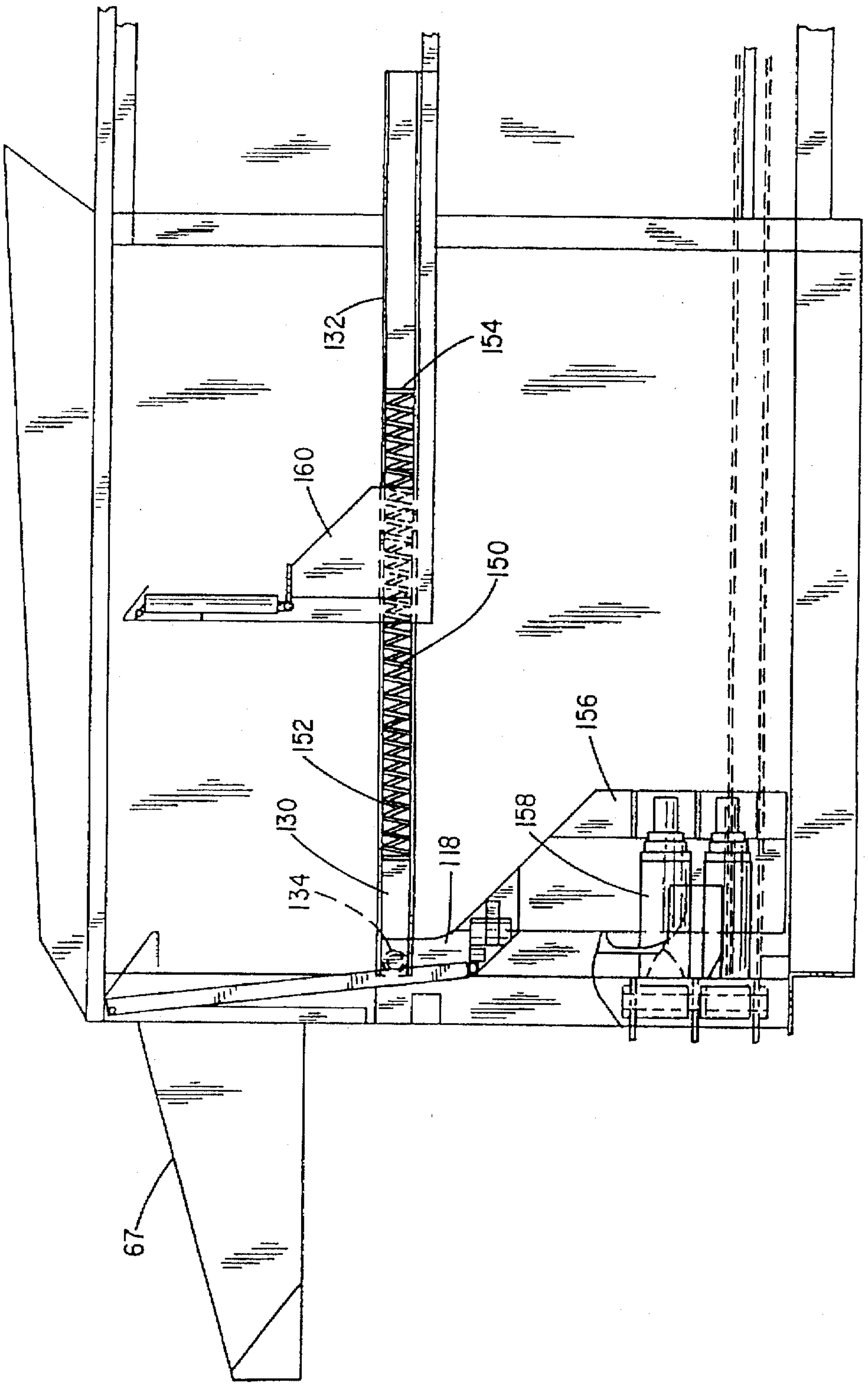
FIG. 8 is a view similar to FIG. 6 depicting a compliant spring linkage between the compaction panels with both compaction panels shown in their fully retracted position.
Figure 9:
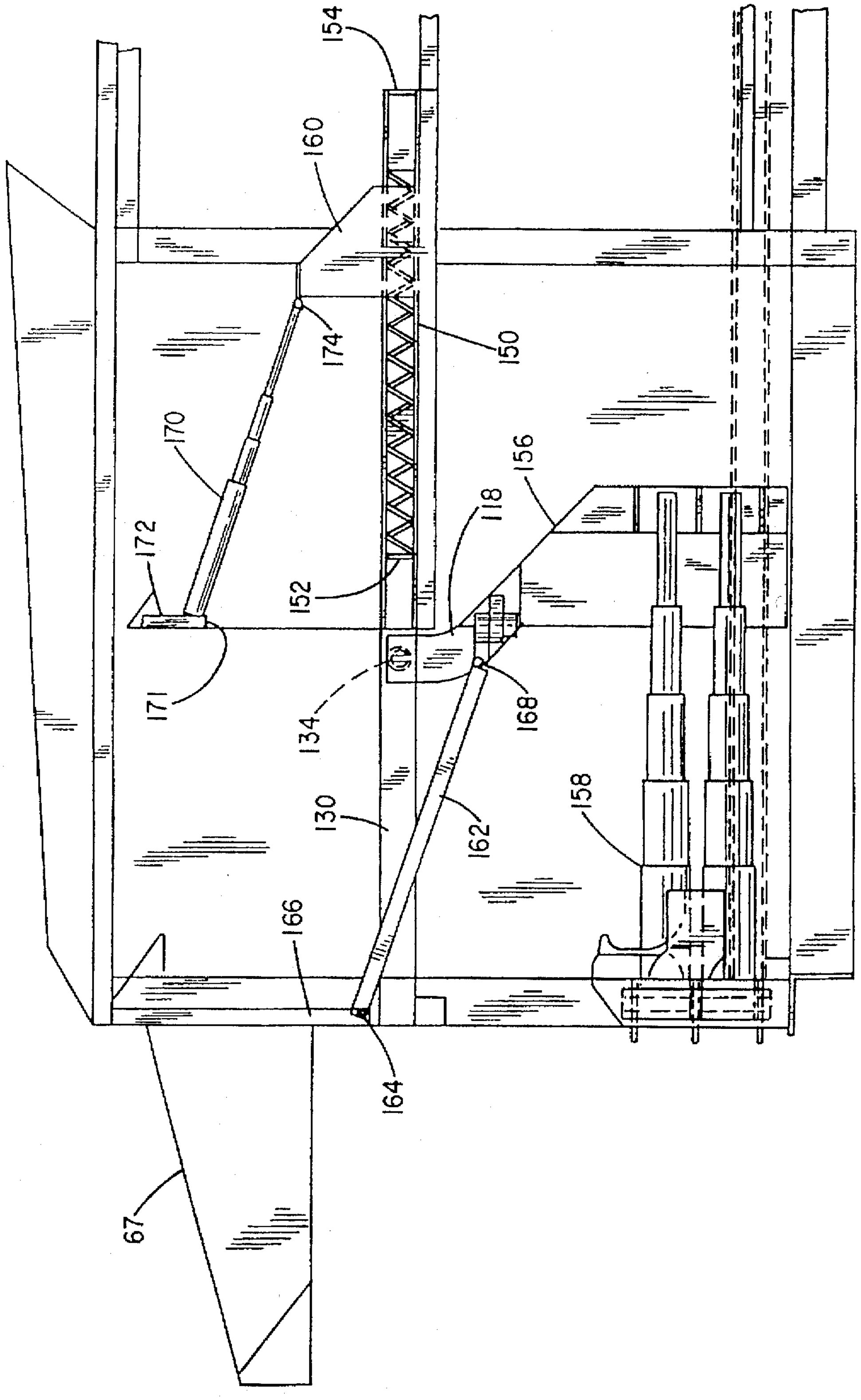
FIG. 9 is a view similar to that of FIG. 8 with both compaction panels extended.
Figure 10:
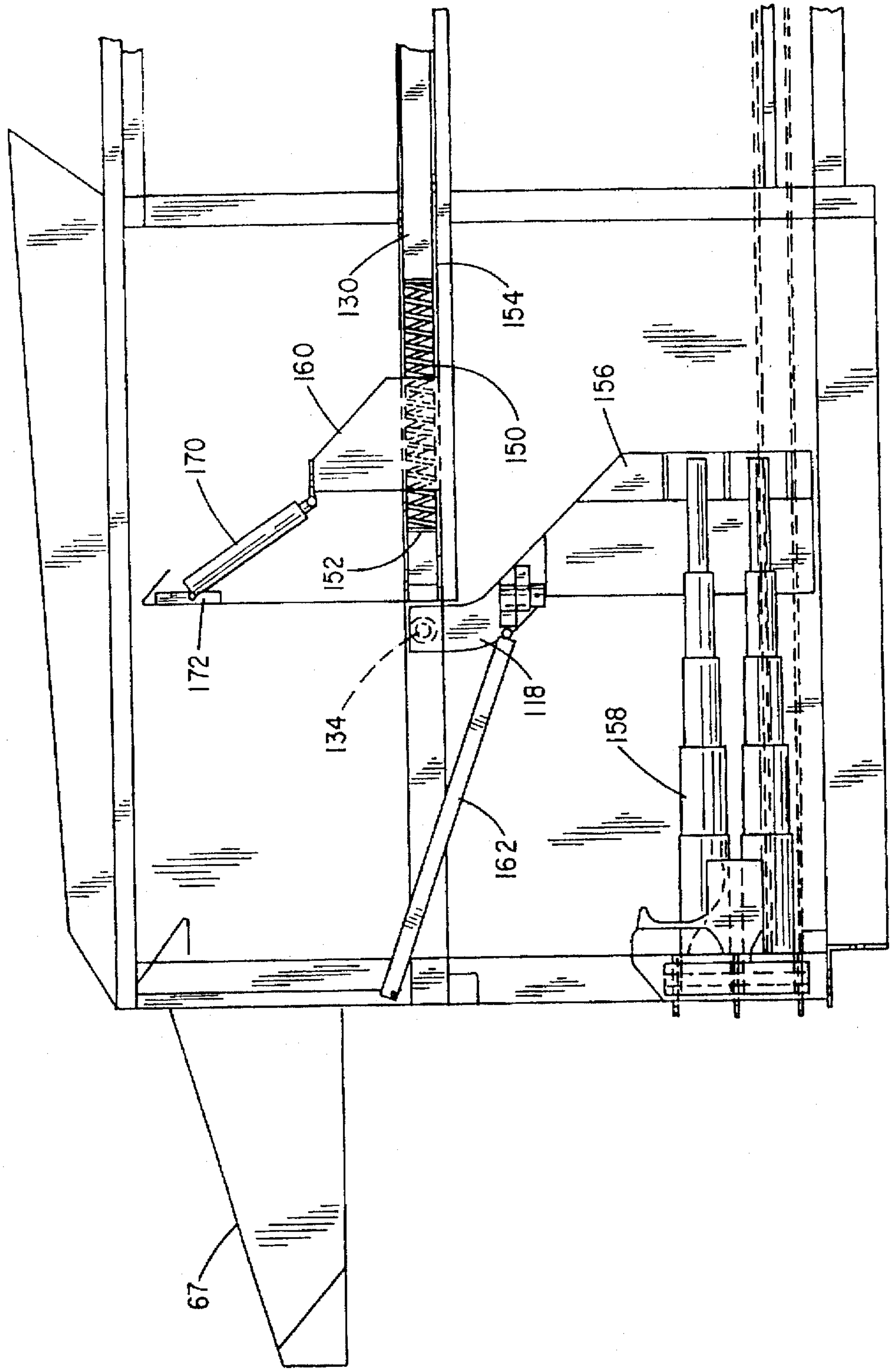
FIG. 10 is a view similar to that of FIG. 8 with the lower compaction panel fully extended and the upper compaction panel partially extended due to force limitation.

FIGS. 8–10 depict a side view of a linkage system such as that depicted in the cross-sectional view of FIG. 5 in which the forcing means is a compliant spring 150 progressing from the retracted position (FIG. 8) to a position where both compaction panels are fully extended (FIG. 9), with FIG. 10 depicting the situation in which the lower compaction panel is fully extended and the upper compaction panel partially extended. The inner telescoping tube pivot connection or connecting link pin 134 connects the linkage lever 118 to the inner tube 130. The forward end of spring member 150 at 152 is fixed to the tube 130 such that reciprocation of the member 118 exerts forward and aft force on the end 152 of spring 150. The other or rearward directed end of spring 150, at 154, is attached to the outer tube member 132.

The lower compaction system includes a lower compaction panel 156 operated by one or more fluid cylinders 158. The compaction panel is typically operated by a pair of spaced cylinders operating in unison. These cause the reciprocal motion of the lower compaction panel 156 to compact the refuse entering the lower loading hopper rearward into the lower storage body.

The upper compaction panel 160 is connected to the outer tube 132 to move with the resiliently telescoping system including inner and outer tubes 130 and 132 with interconnecting spring 150. The outer tube 132 contains a stop member on its forward end which engages the end of the slot 148 (FIG. 5) in the inner tube to limit the extension of the telescoping tube linkage and allow the spring 150 to be under partial compression or some desired preload.

As can be seen in FIG. 8, when the lower compaction panel 156 is retracted, the tube linkage is at its maximum length with the spring fully extended to pull the upper compaction panel forward into its retracted position. In FIG. 9, the load in the upper compartment is not exerting sufficient forward pressure to compress the spring beyond its pre-loaded position and the tube linkage remains at its maximum length forcing the upper compaction panel to its further extended position when the lower panel is fully extended as by telescoping cylinders 158.

FIG. 10 depicts the system in the condition in which the upper compaction panel is extended against a fully loaded upper storage compartment. Note that the spring 152 is compressed to a position in which the maximum desired force is exerted by the upper compaction panel against the load as determined by the force constant of the spring chosen for the application. If the lower storage body is not full, more material can be loaded and compacted without affecting the compaction of the upper load. In this manner, if the upper compaction panel is extended against a fully loaded upper storage compartment, the force is limited to a set value, with the spring collapsed and the telescoping tube linkage compressed. This allows the lower compaction panel to fully extend without placing additional compaction force onto the load in the upper compartment. This is one manner in which the compaction forces can be limited to a predetermined value in the upper storage compartments. This amount is normally determined by the allowable force to be exerted on commingled recyclables including shaped glass material such as bottles which lose a great deal of their value if broken.

Each of the compaction panels is provided with a follower panel. The lower follower panel 162 is pivotally connected by a roller 164 attached to an upper guide 166 and has its other end attached to a pivot system 168 attached to the rear of the lower compaction panel 156 so that the lower follower panel pivots as the lower compaction panel reciprocates to prevent material coming into the lower loading hopper from falling behind the lower compacting panel. Likewise, the upper compaction panel 160 is provided with a telescoping upper follower panel 170 which is pivotally connected by a roller 171 to upper follower guide member 172 which extends across the width of the upper storage body to a pivotal system 174 attached to the rear of the upper compactor panel 160. This, in like manner, prevents material from falling behind the upper compaction panel when same is extended.

Figure 6:
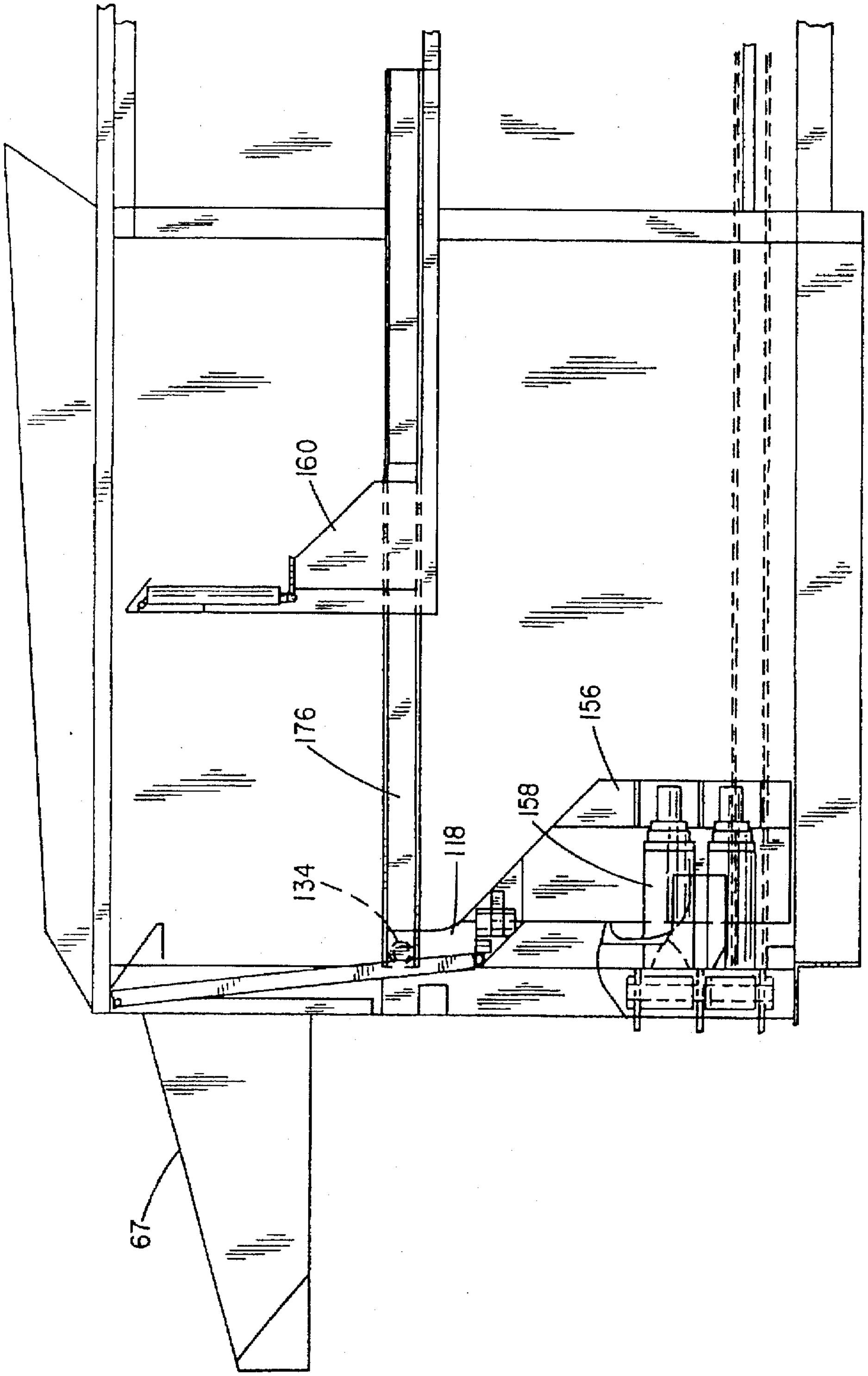
FIG. 6 is an enlarged fragmentary side view, with side panels removed, of the forward portion or loading hopper area of a compartmentalized collector truck body having upper and lower compaction panels connected by a solid linkage in a fully contracted position.
Figure 7:
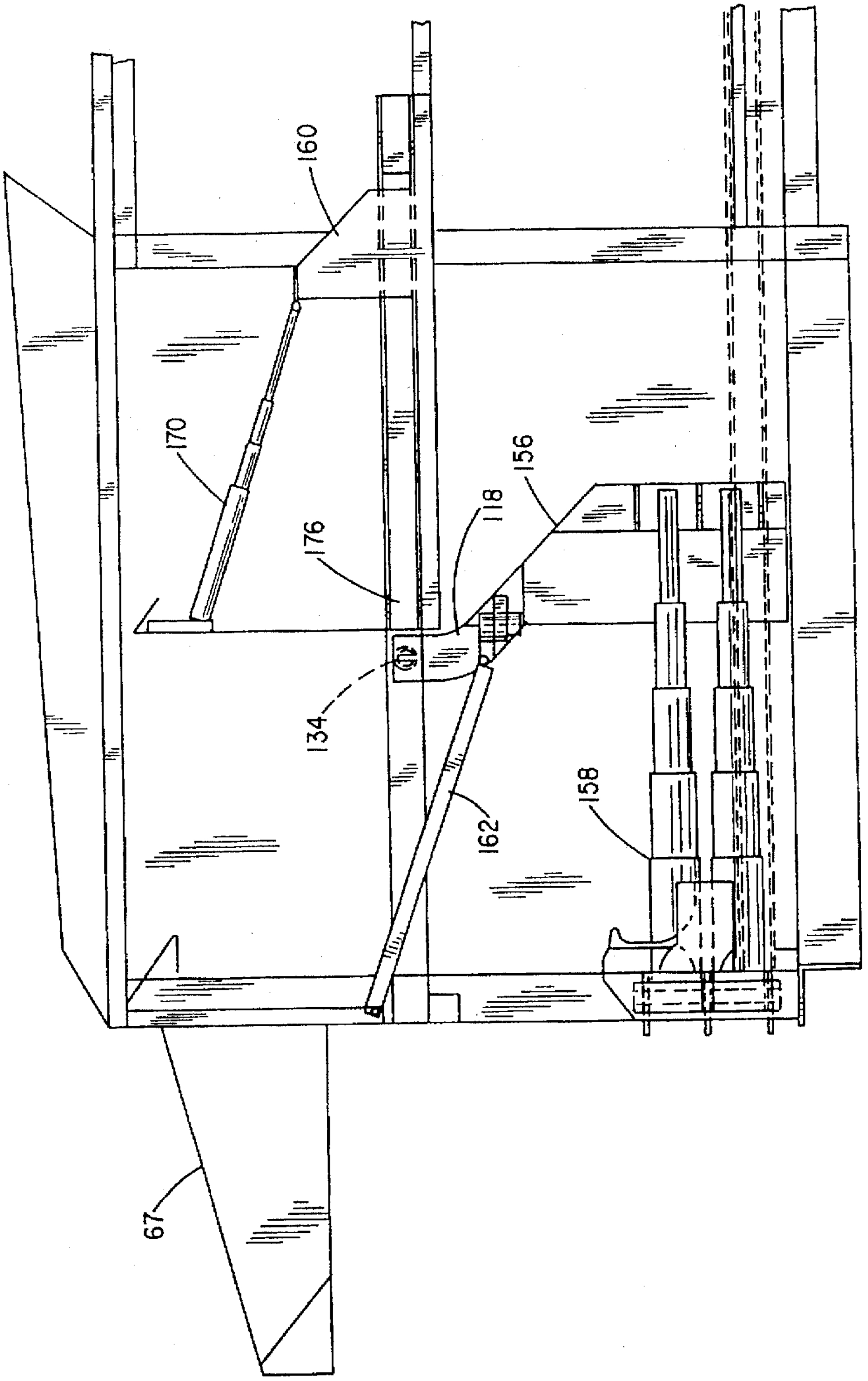
FIG. 7 is a view of the solid linkage embodiment of FIG. 6 with both compactor panels in their fully extended position.

FIGS. 6 and 7 depict a coordinated upper/lower compaction panel system similar to that depicted in FIGS. 8–10 except that the connection between the linkage lever 118 and the upper packer blade 160 is a single member which provides a solid linkage such that the upper panel moves in unison with the lower panel in both directions. FIG. 7, accordingly, illustrates the system of FIG. 6 in the fully extended position which is similar to the system of FIGS. 8–10 in the unloaded condition. Note in FIG. 10 the rather large amount of cushion space the spring 150 allows the recyclables in the upper storage body. The solid linkage embodiment is mechanically simple and virtually maintenance-free. In applications where breakage or glutting of the material is not a problem, this approach may be preferred.

Figure 11:
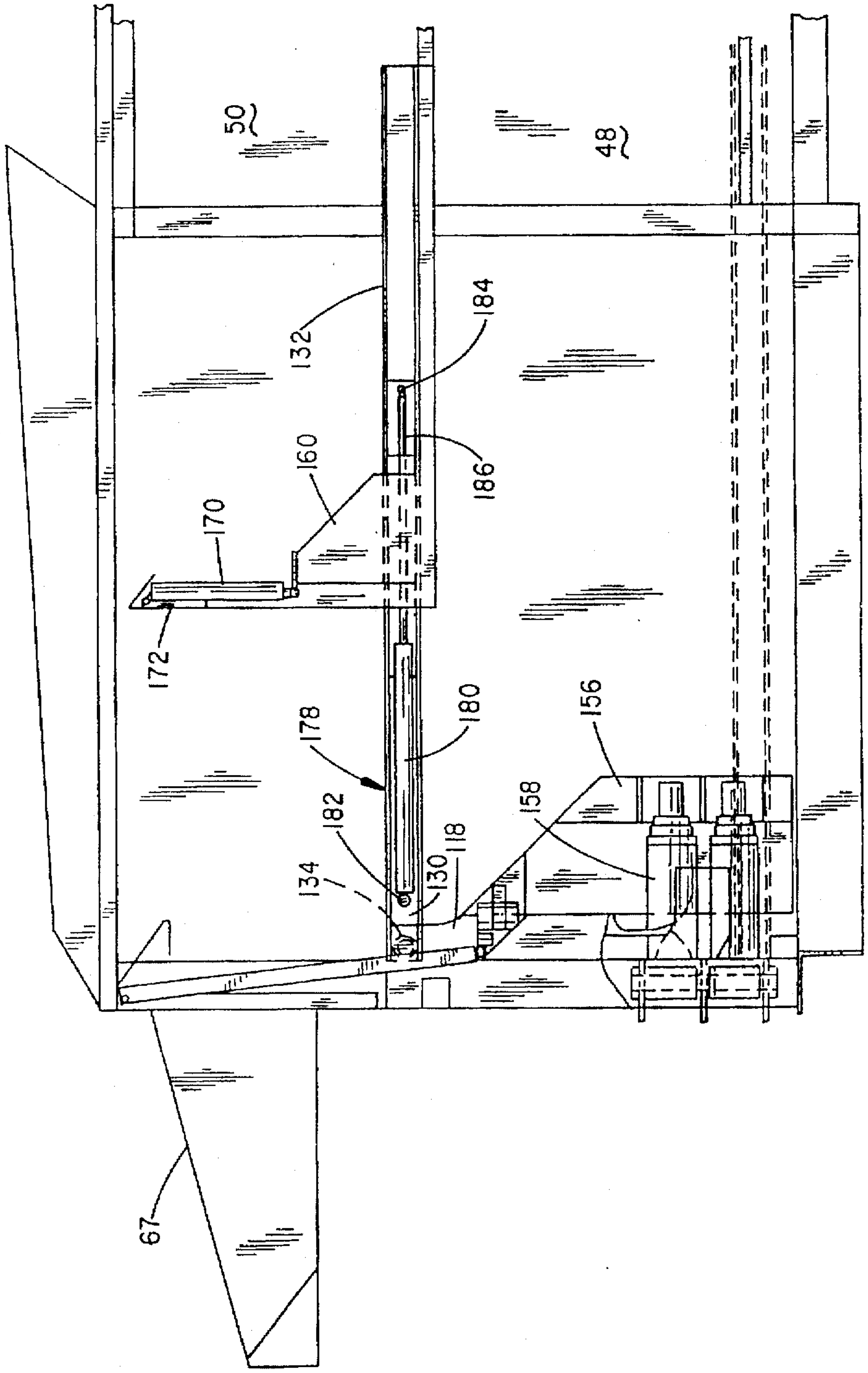
FIG. 11 is a view similar to FIG. 6 utilizing a collapsible complaint hydraulic cylinder linkage between the compaction panels with both compaction panels in the fully retracted position.
Figure 12:
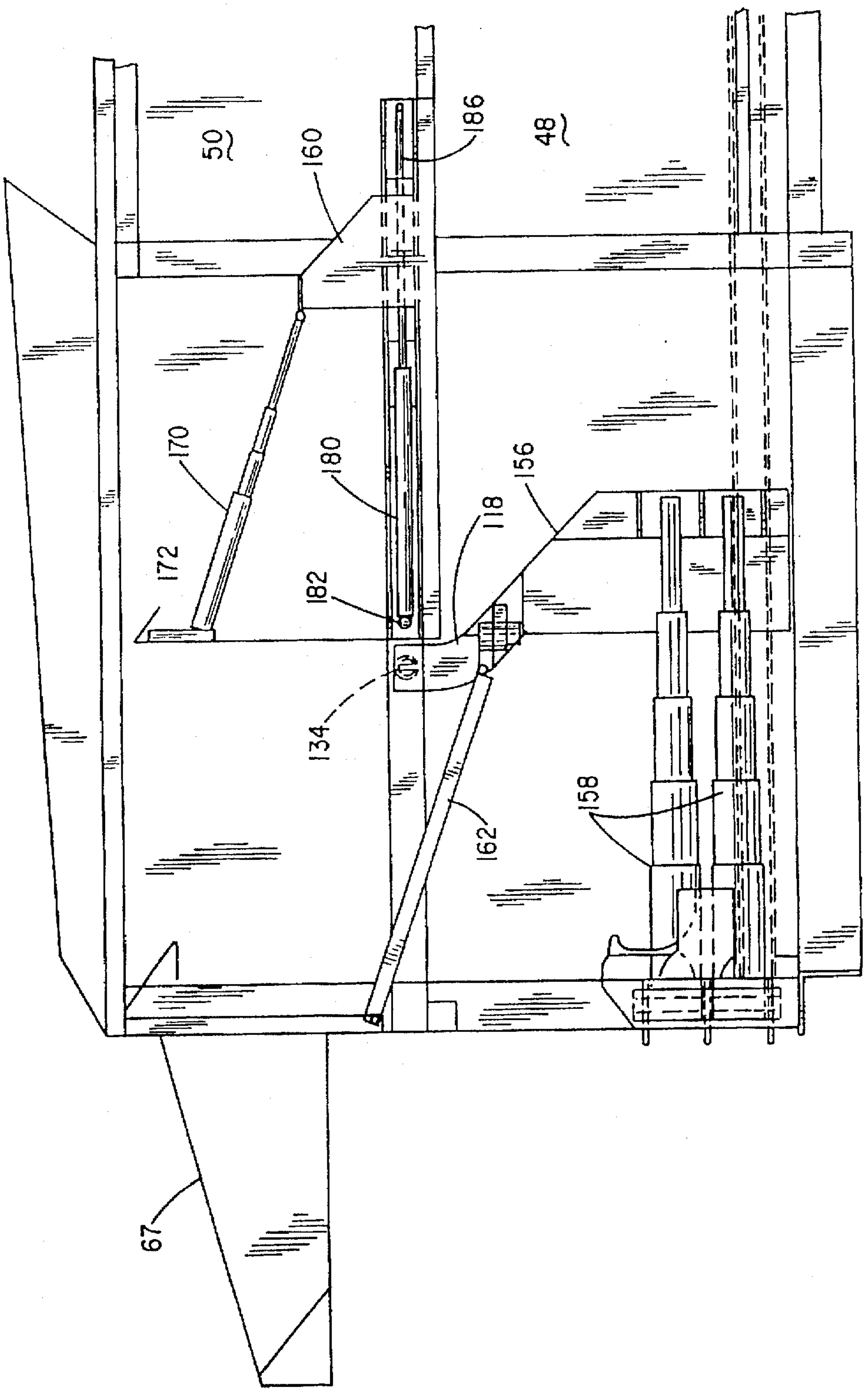
FIG. 12 is a view similar to that of FIG. 11 with both compaction panels in their extended position.
Figure 13:
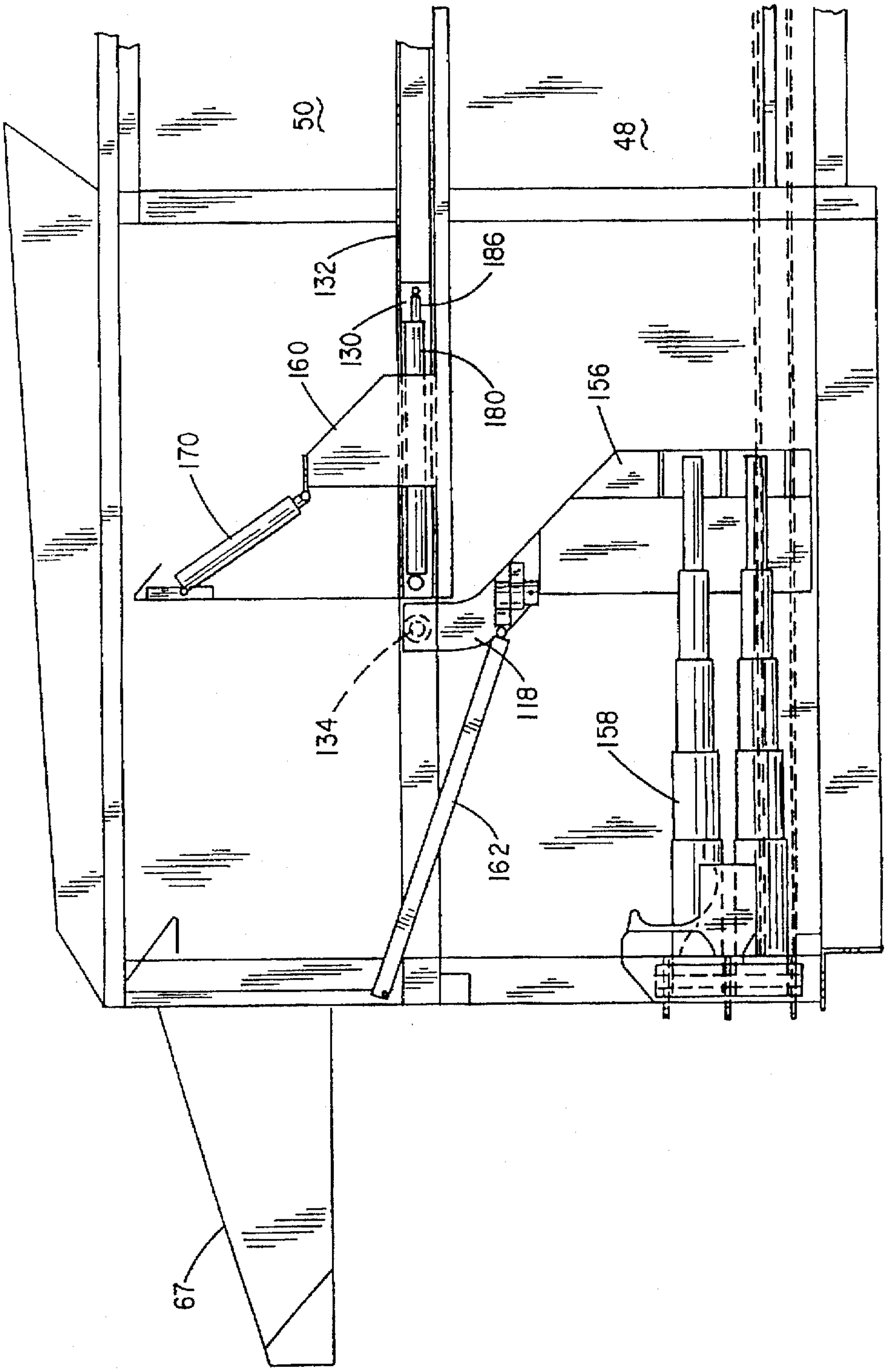
FIG. 13 is a view of the system of FIG. 12 in which the lower compaction panel is fully extended and the upper compaction panel partially extended due to force limitations.

Another embodiment of a coordinated packing system is illustrated by FIGS. 11–13 which employs a compliant fluid operated cylinder linkage 178 in place of the compliant spring 150 or direct linkage member 176 which includes a cylinder 180 having a cylinder end connected to the inner telescopic linkage tube 130 at 182 and a rod end 184 connected to the outer telescopic linkage tube 132. In FIG. 11, the packer blades 156 and 160 are fully retracted and the hydraulic cylinder 180 is in its fully extended position, i.e. with rod 186 fully extended. It is the fully exended cylinder that pulls the outer telescoping linkage tube 132 and with it the upper compaction panel to assume a retracted position in which case, the lower compaction panel is fully retracted. It will be noted that the cylinder 180 is a cushioning or compliant hydraulic or pneumatic cylinder which operates in a passive rather than active manner with respect to the deployment of the packer panel 160.

In FIG. 12, the lower ram fluid cylinders 158, and so the ram 156, is shown fully extended rearward so the connecting linkage lever 118 along with the cylinder connection 182 are also at their fully rearward position with respect to the upper storage body. In the illustration of FIG. 12, the upper compaction panel is not exerting sufficient force to collapse the hydraulic cylinder; therefore, it remains fully extended, thereby moving the upper compaction panel to its fully rearward extended position in coordination with the fully extension of the lower compacting panel 156. In FIG. 13, the effect of extending the upper compaction panel against a fully loaded upper storage compartment is illustrated. The force against the upper compaction panel 160 causes the rod 186 to collapse or retract into the cylinder 180 to thereby limit the travel of the compaction panel 160 against the load. The hydraulic or pneumatic cylinder 180, in this case acts like a cushion somewhat in the manner of the familiar door-closer cylinder which cushions closure. The force required to initiate the retraction of the cylinder can be set to any desired value such as that required to prevent damage to glass materials in commingled recyclables in the upper storage body 50. In this manner, the lower compaction panel 156 is allowed to extend to its fully extended position without forcing the connected upper compaction panel to exceed a desired maximum compression force.

Figure 14:
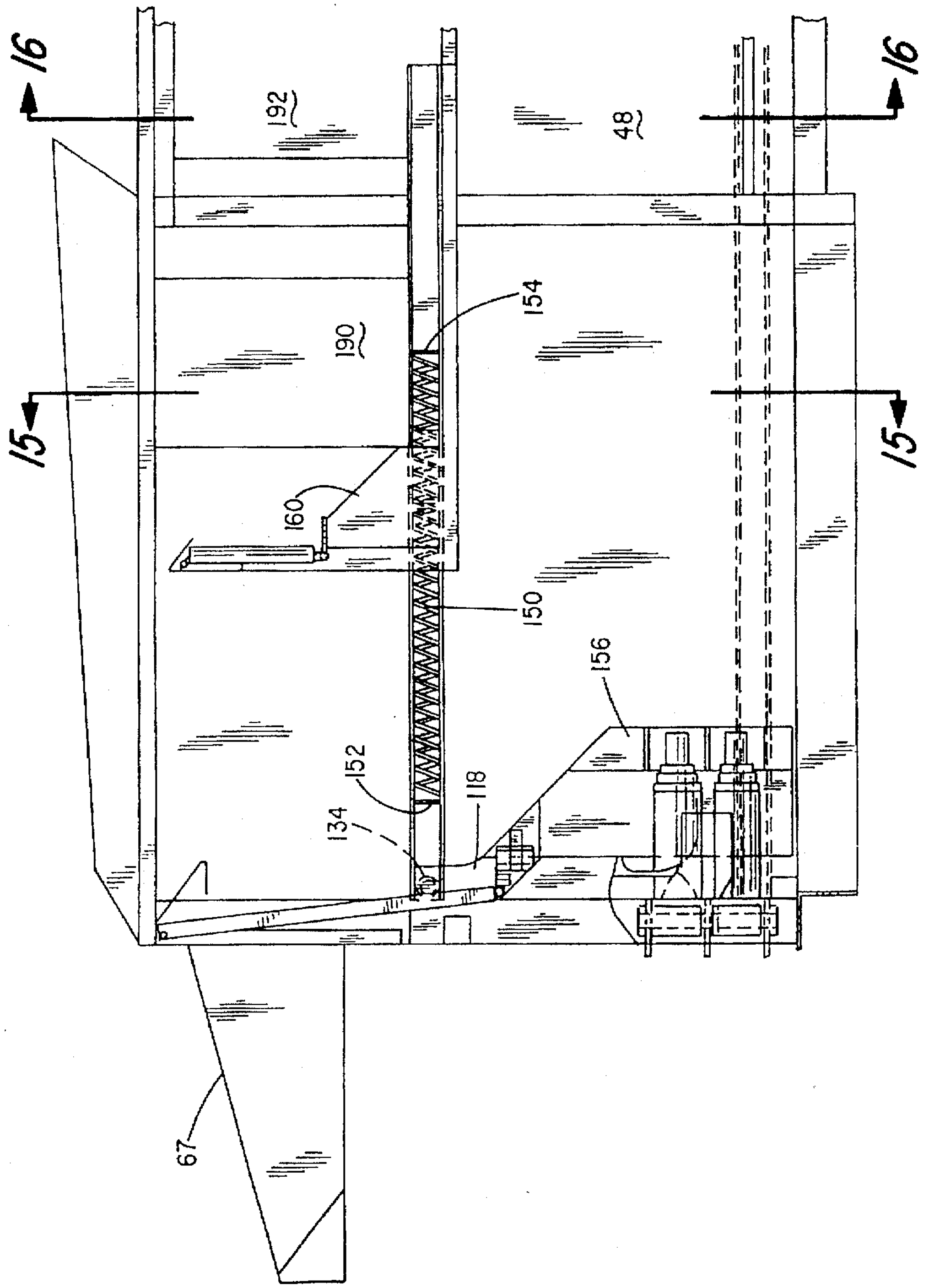
FIG. 14 is a side view similar to FIG. 6, of a three-compartment body with a divided upper compartment utilizing a compliant spring upper panel compaction system and a telescoping divider panel.
Figure 15:
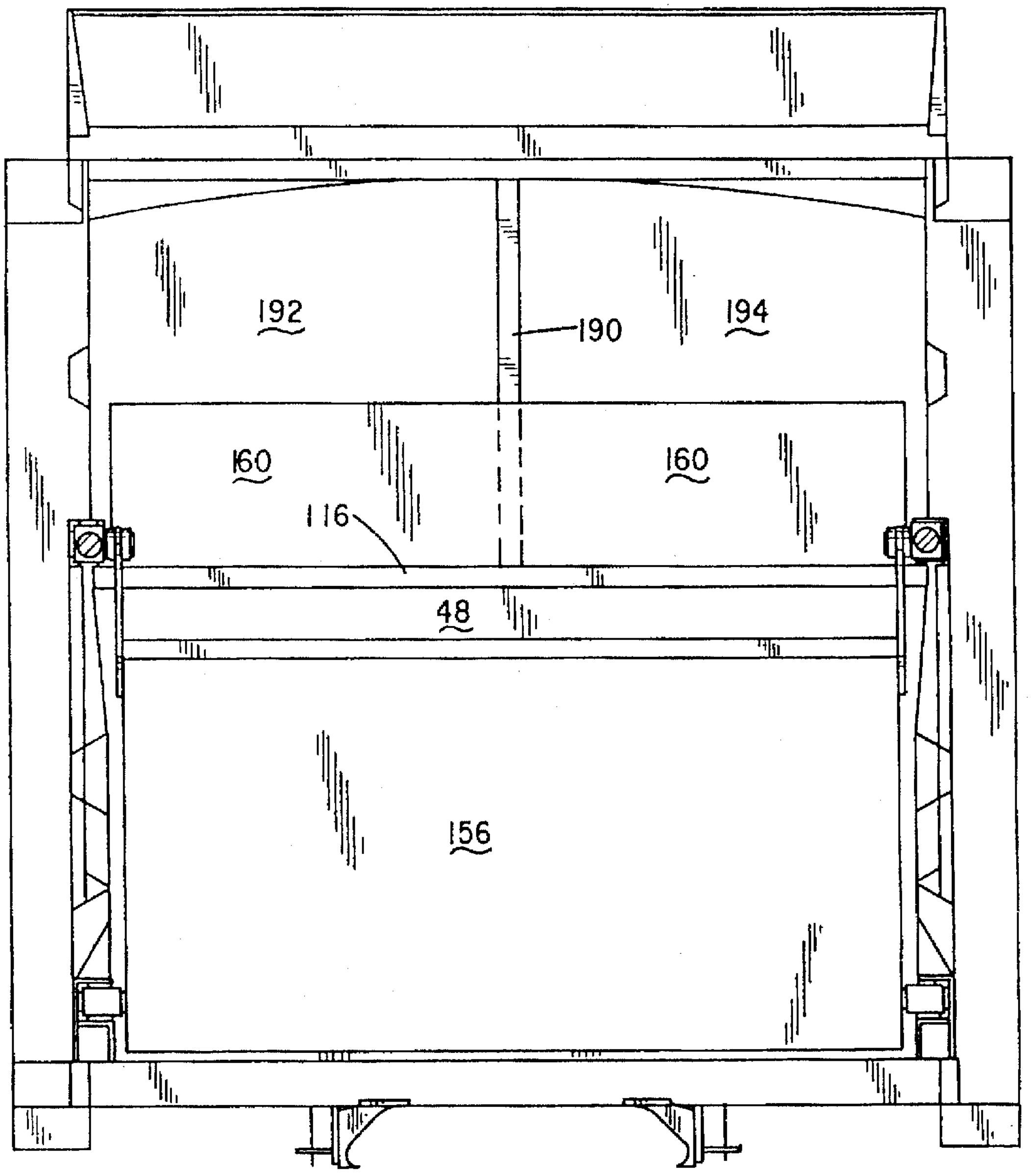
FIG. 15 is a sectional view substantially along lines 15—15 of FIG. 14 showing the three compartments.
Figure 16:
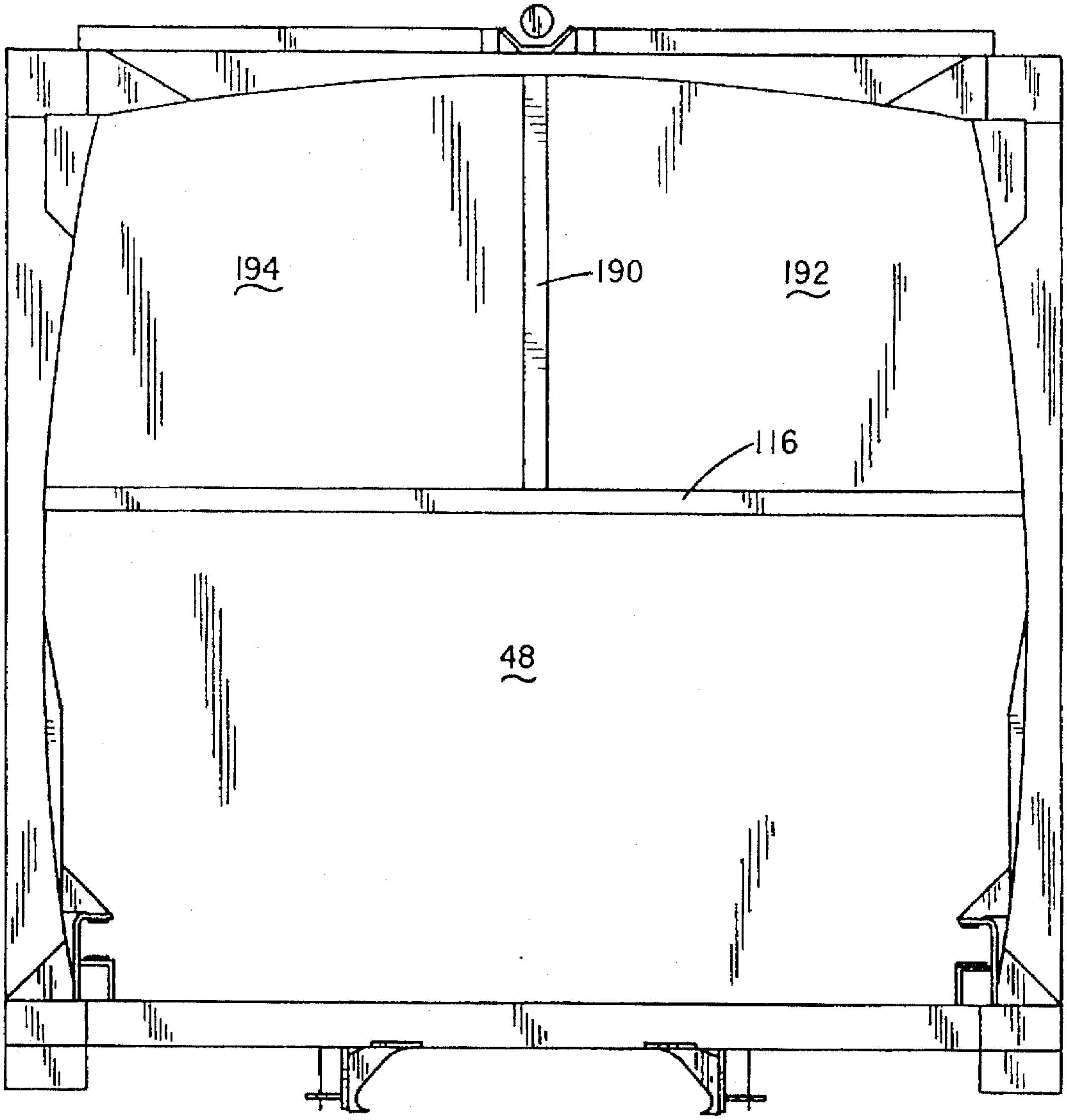
FIG. 16 is a sectional view of the three-compartment body with divided upper compartments taken substantially along lines 16—16 of FIG. 14.

FIG. 14 depicts an open side view of a three compartment body in which the upper storage body is further divided into a pair of side-by-side upper compartments. This can best be appreciated in conjunction with the forward and aft directed sectional views of FIGS. 15 and 16. A telescoping divider wall or panel 190 divides the upper compartment into compartments 192 and 194 in conjunction with the operation of the compaction panel 160 and allows the single upper compaction panel 160 to provide compaction for two side-by-side compartments and maintain separation while, at the same time, allowing for fore and aft motion of the upper compaction panel 160.

Figure 17:
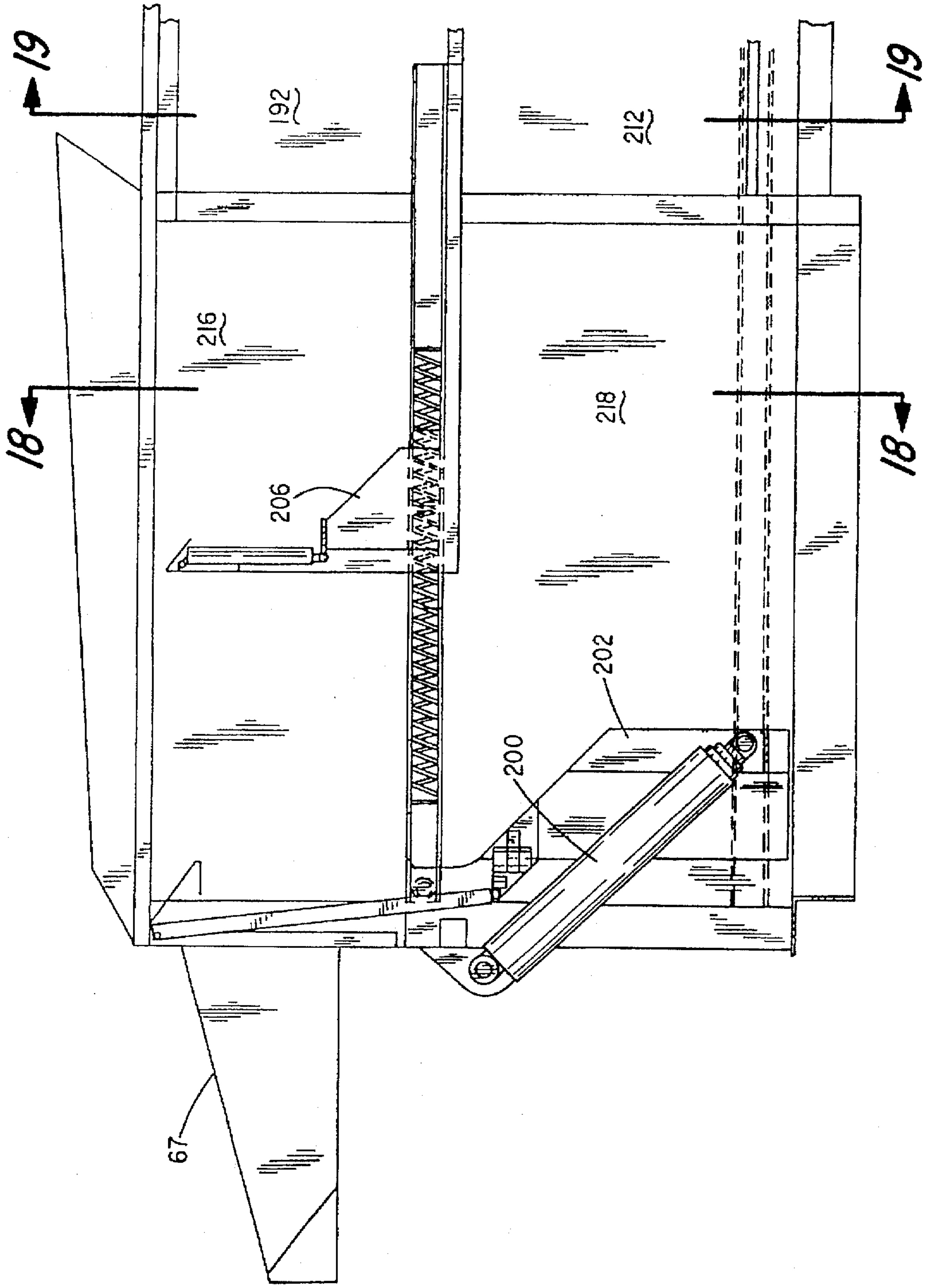
FIG. 17 is a side view with outer panels removed, of a four-compartment (two upper, two lower) compartmentalized collection vehicle body.
Figure 18:
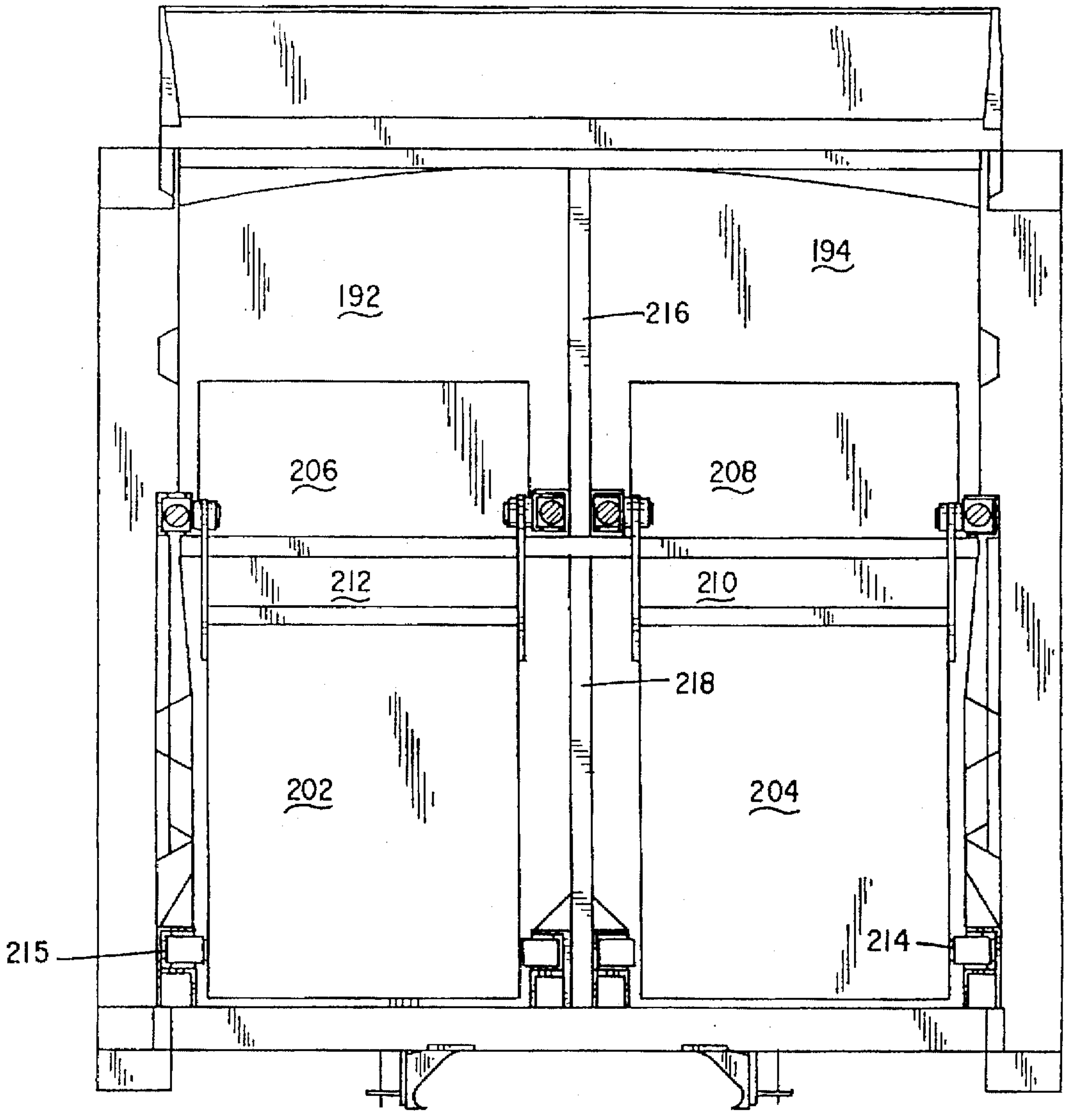
FIG. 18 is a sectional view substantially along lines 18—18 of FIG. 17 showing dual side-by-side compacting panel systems.
Figure 19:
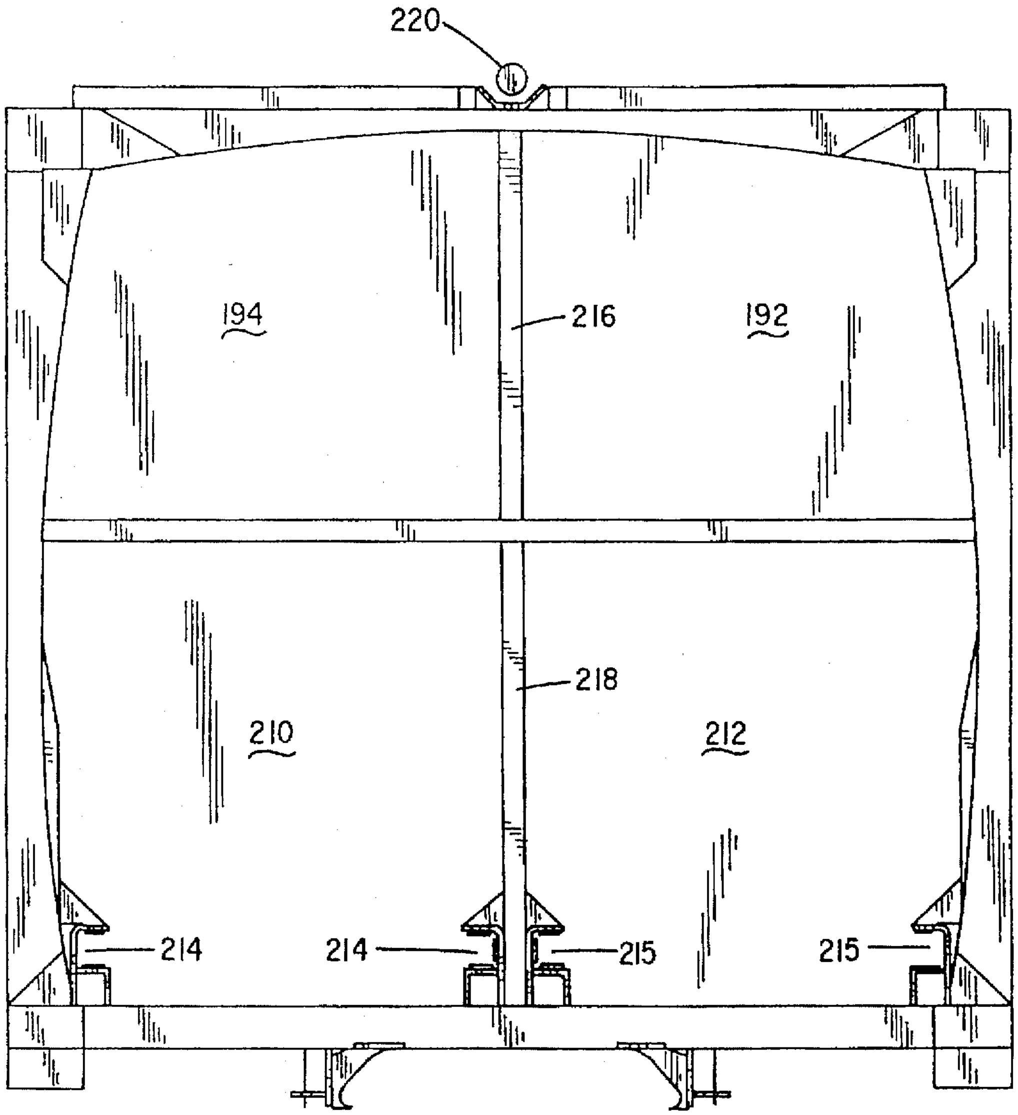
FIG. 19 is a sectional view substantially along lines 19—19 of FIG. 17.

FIGS. 17 and 18 depict a four compartment storage body in which lower compaction cylinders, one of which is shown at 200 in FIG. 17 operate separate compaction panels as at 202 and 204 in FIG. 18. Four linkages of the solid, spring (illustrated) or cylinder type connect two upper compaction panels 206 and 208 such that each upper compaction panel operates in conjunction with a corresponding lower compaction panel as described above. FIG. 19 is a cross-sectional view taken substantially along lines 19—19 of FIG. 17 and illustrates the aft-oriented view beyond the reach of the upper compaction rails and showing the divided compartments including lower compartments 210 and 212 with their corresponding guide rails 214 and 215. Upper and lower divider panels 216 and 218 are permanently mounted in this embodiment between separate coordinated upper and lower compaction panel devices, as illustrated in FIG. 18. In this manner, the upper left compaction panel 206 is linked with the lower left compaction panel 202 and, likewise, the upper right compaction panel 208 with the lower right compaction panel 204 in the manner previously described utilizing any of the linkage types desired. FIG. 19 also depicts a top door cylinder 220.

Figure 20:
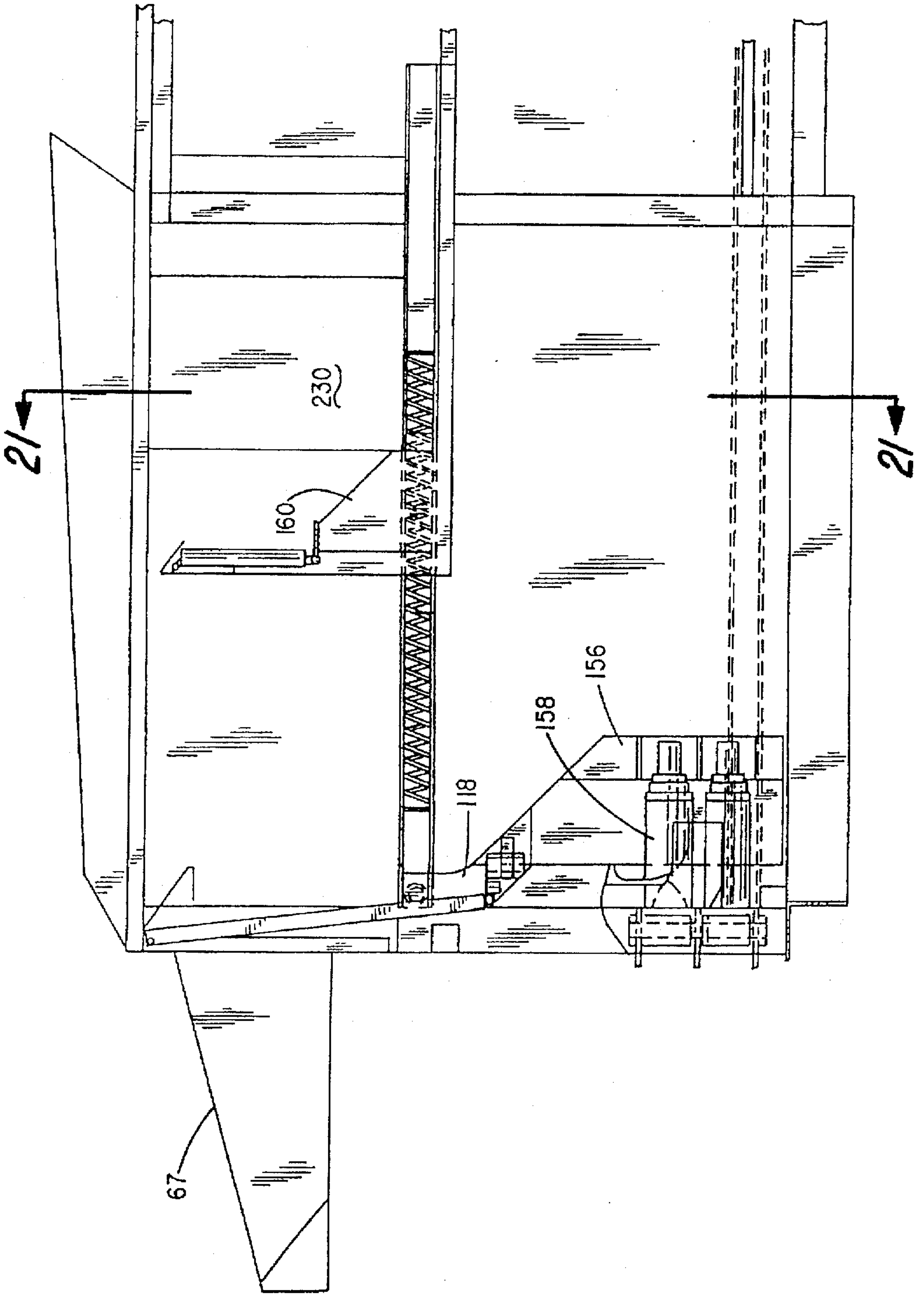
FIG. 20 is a side view similar to FIG. 17 of a four-compartment collection vehicle body with three upper compartments.
Figure 21:
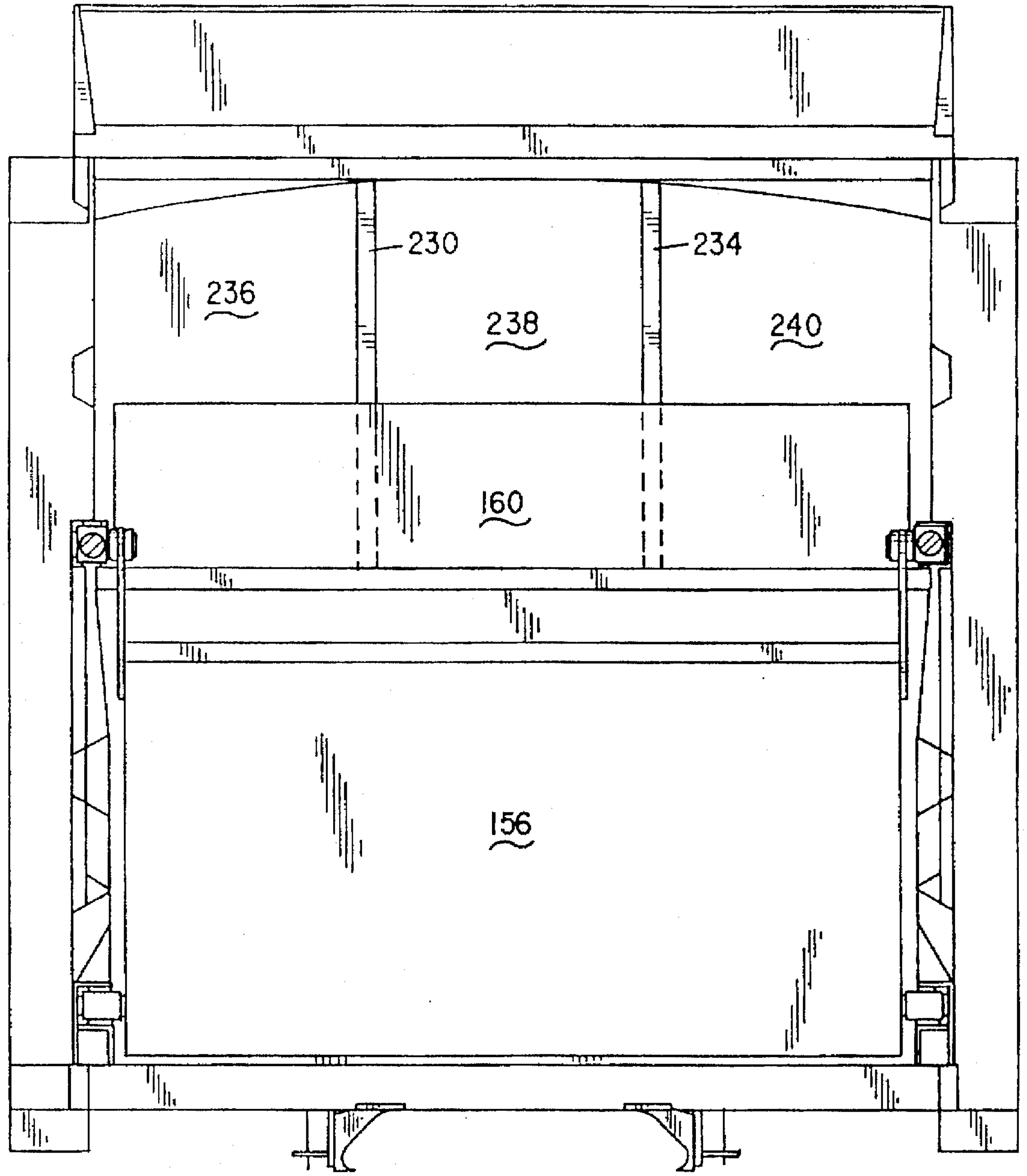
FIG. 21 is a sectional view substantially at 21—21 of FIG. 20.

FIGS. 20 and 21 depict a side view and forward directed sectional view, respectively, of alternate four-compartment storage body with three upper compartments. It will be noted that the pair of upper divider panels 230 and 234 telescope in the manner of the panel 190 described in conjunction with FIGS. 14–16, above. In this manner, a single full-width lower compaction panel system having a panel as at 158 and operated single upper compaction panel 160 enable a single upper compaction panel to address all three upper compartments utilizing any of the connection mechanisms previously herein described.

Figure 22:
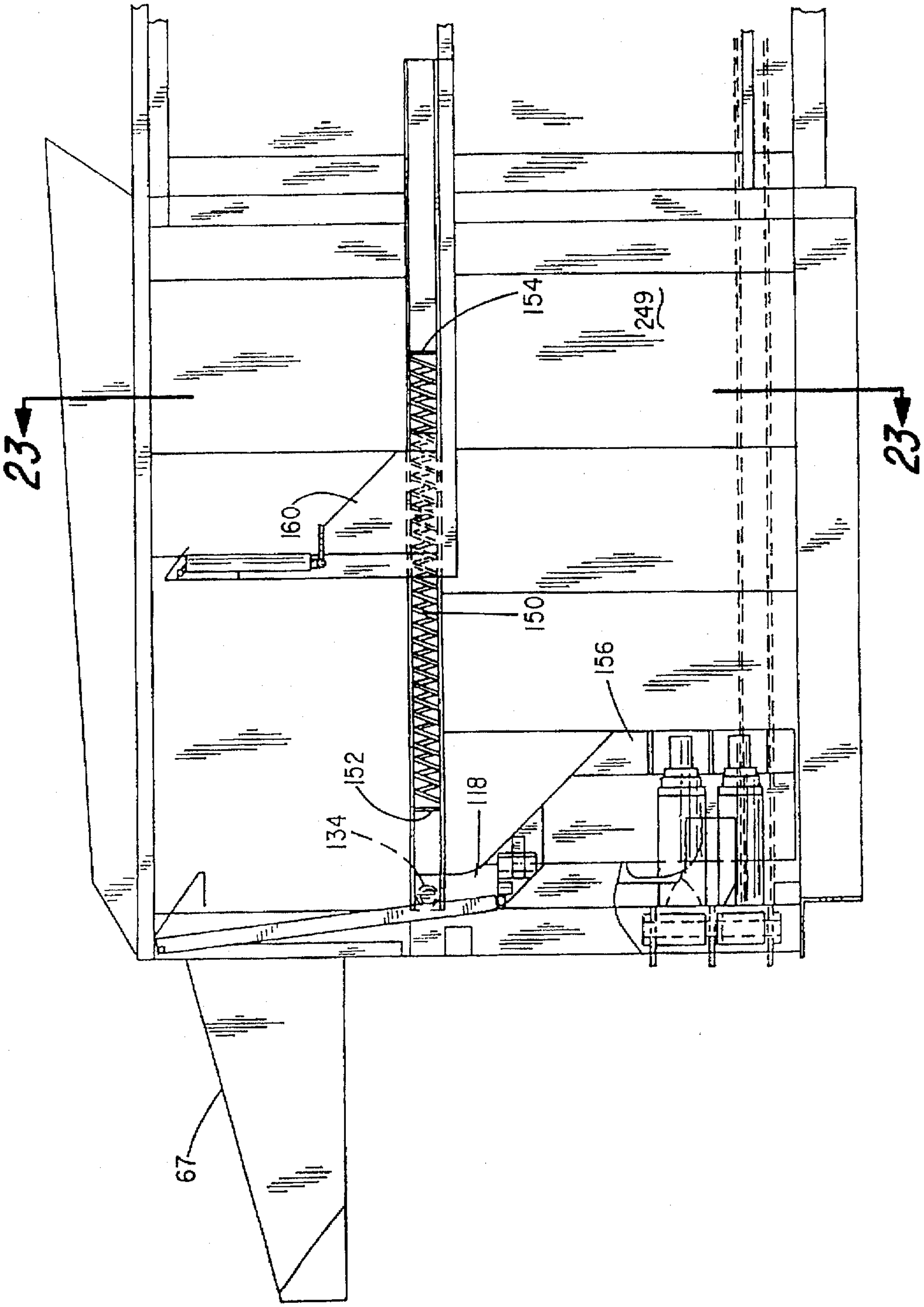
FIG. 22 is a side view with side panels removed of a five-compartment collection vehicle body having three upper and two lower compartments.
Figure 23:
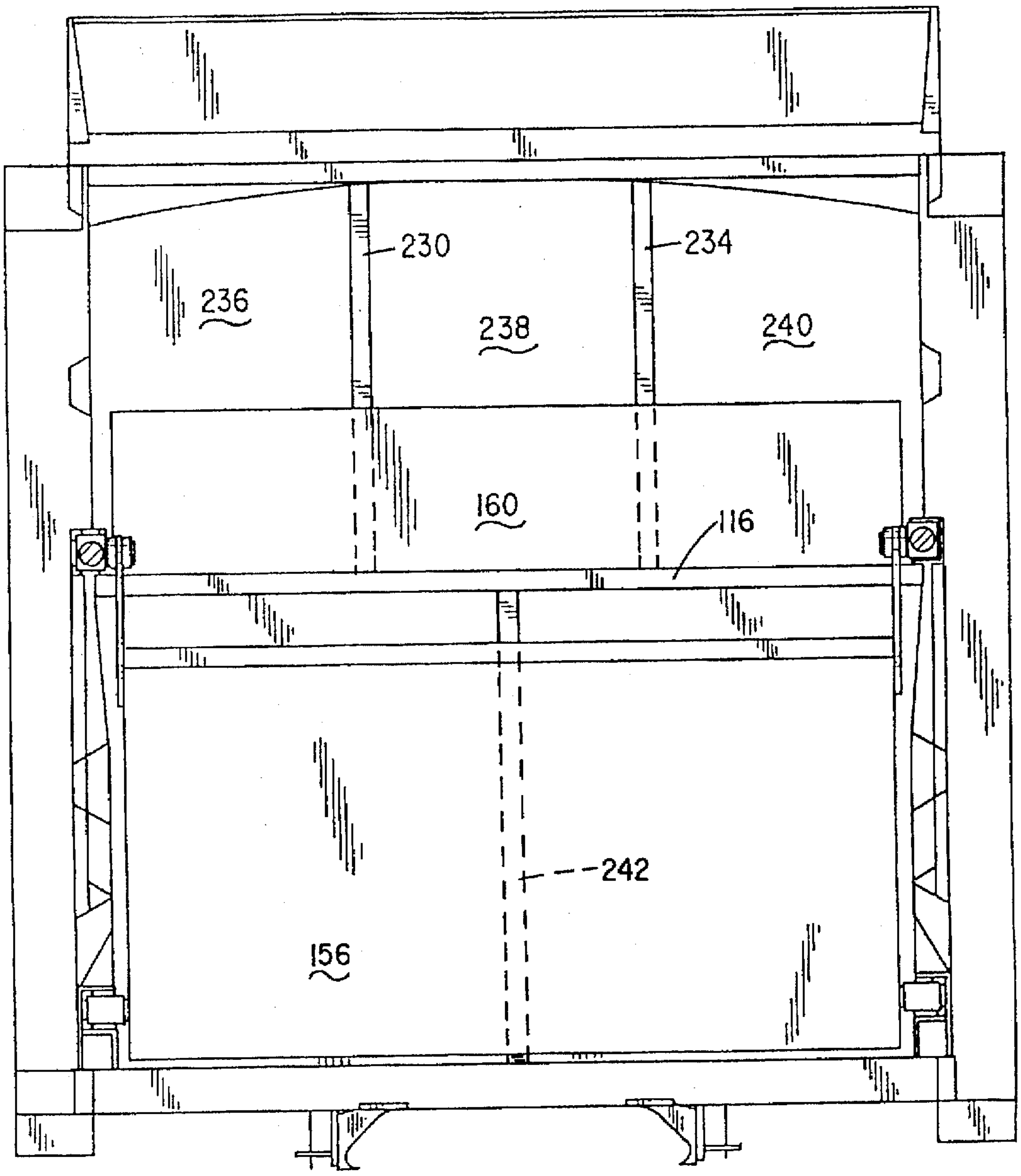
FIG. 23 is a sectional view taken substantially at 23—23 of FIG. 22 with a single lower and linked upper compaction mechanism with two telescoping dividers.

An embodiment that features a plurality of upper and lower storage body compartments is shown in FIGS. 22 and 23 which, like the multi-compartment embodiment of FIGS. 20 and 21 uses a single lower and upper compaction system. FIGS. 22 and 23 depict an arrangement of a five compartment body in which the upper storage body is divided as in FIG. 21 into three substantially equal compartments 236, 238 and 240 by a pair of telescoping divider panels 230 and 234 attached to a single upper compaction panel 160. The lower storage body is also divided in two by a lower telescoping divider panel 242 which is operated by a single lower compaction panel 156.

Figure 24:
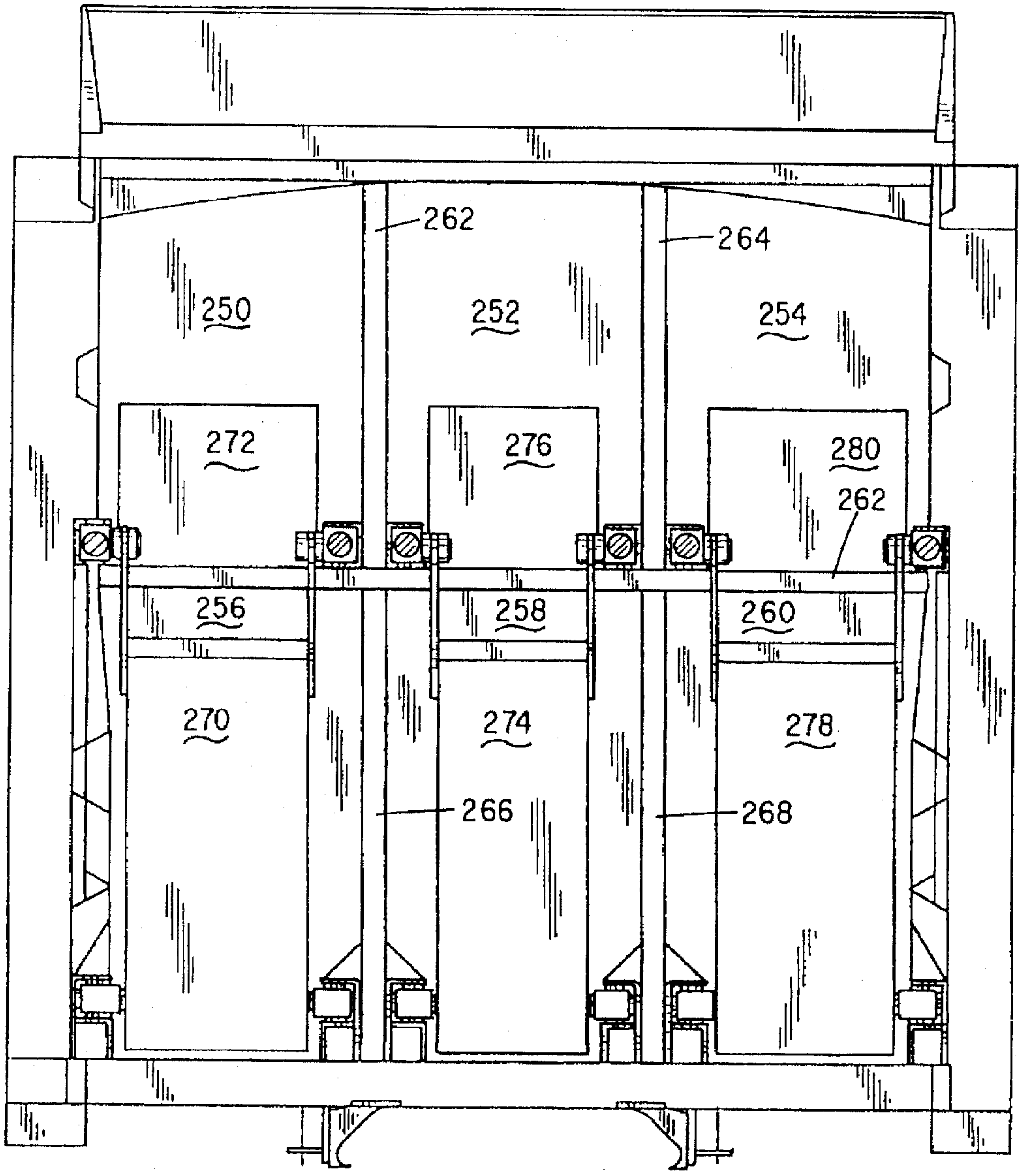
FIG. 24 is a sectional view similar to FIG. 23 showing a six-compartment body with three lower and three linked upper compaction mechanisms.

An additional configuration is depicted in FIG. 24 in which the upper storage body is divided into three longitudinal compartments 250, 252 and 254 and the lower storage body into three compartments 256, 258 and 260. The upper and lower bodies are separated by permanent horizontal panel 262 and, likewise, the upper and lower compartmentalized storage bodies may be separated by permanent panels 262, 264, 266 and 268. Pairs of coordinated upper and lower compaction panels as at 270/272, 274/276, and 278/280 are depicted which operate in coordinated fashion utilizing any of the linkage systems previously described.

Figure 25:
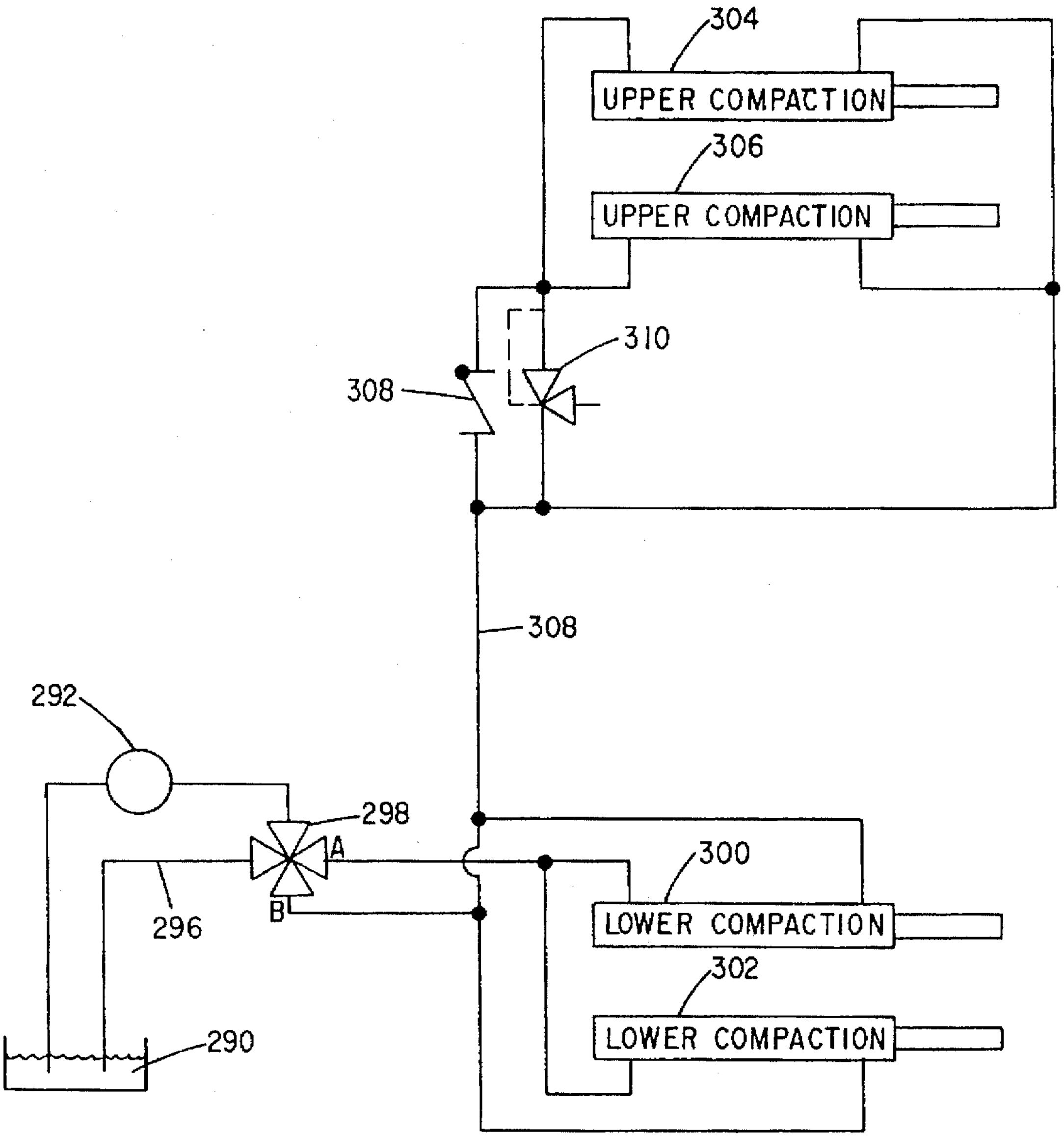
FIG. 25 is a schematic view of a hydraulic system for one embodiment of a compliant hydraulic cylinder concept.

A schematic diagram of a hydraulic system for a compliant hydraulic cylinder operation as with the embodiment of FIGS. 11–13 is shown in FIG. 25. The system includes a reservoir 290 and a hydraulic pump 292, associated high pressure line 294, and a return line 296 connected to a four-way (four position) control valve 298. A pair of double acting lower compaction cylinders 300 and 302 are provided along with upper compaction cylinders 304 and 306 which are tapped into common rod port line 308 of the lower compaction cylinders 300 and 302. The system also contains a check valve 308 and relief valve 310 associated with the compliant operation of the upper compaction cylinders 304 and 306.

The system is operated utilizing a four-way valve 298 (three position) control. At the start of the compaction or power stroke, the lower compaction cylinders 300 and 302 are fully contracted and the upper cylinders 304 and 306 fully extended as shown in FIG. 11 during the expansion stroke, high pressure fluid is provided at the cylinder end of cylinders 300 and 302 and is forced out of the rod ends to return to the reservoir. This also allows fluid to drain through the relief valve 310 from the cylinder ends of the upper compaction cylinders 304 and 306 if upper compactor panel meets with sufficient resistive force to open the relief valve 310. In the retraction or return stroke of the lower compaction cylinders, the rod ports of cylinders 300 and 302 are pressurized and the end cylinder ports opened to the return line. Pressurization of the rod ports of the lower compaction cylinders also imparts a positive pressure through the upper circuit including check valve 308 to the cylinder end and through direct connection to the rod ends of the cylinders 304 and 306. This insures that as the lower cylinders retract, positive pressure is applied to both ends of the upper cylinders, thereby enabling them to extend while, at the same time, preventing vacuum cavitation from occurring in the upper cylinders as they expand during the retraction stroke. In this manner, the hydraulic system both allows for pressure relief, thereby limiting the force applied by the upper compaction panel while also preventing cavitation during the expansion of those cylinders.

Figure 26:
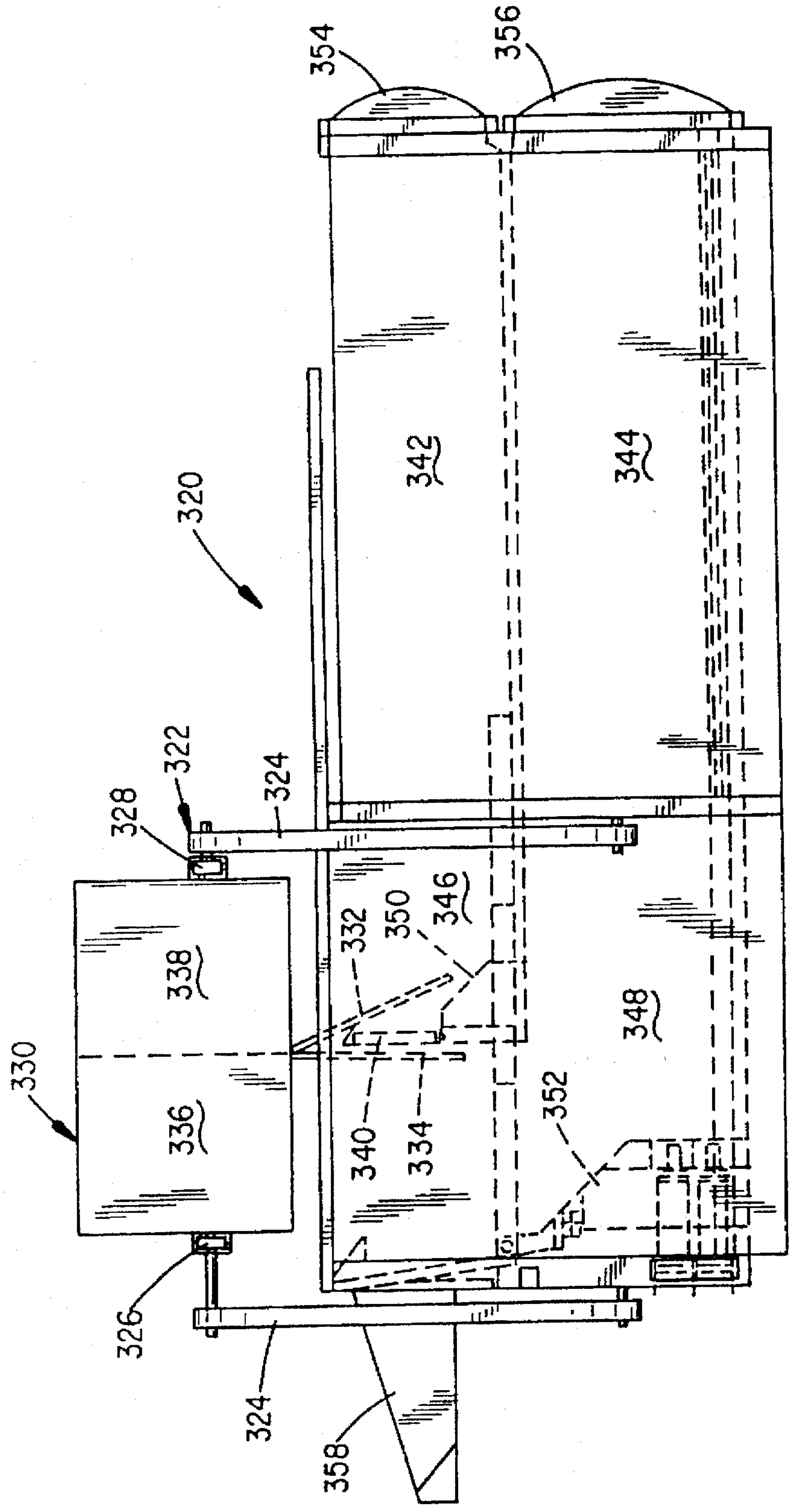
FIG. 26 depicts an enlarged partial view of a side loading truck body with a divided container in the dump position.

FIG. 26 depicts a side view of a side loading vehicle, generally at 320, with a side-loading lift and dump mechanism shown generally at 322 including a pair of lift arms 324 with lifting forks 326 inserted into a pair of lift handles 328 associated with a divided refuse box 330 with covers 332 and 334 covering separate compartments indicated by 336 and 338 to keep the dumped materials separate, i.e., fore and aft of panel 340. Upper and lower storage body compartments 342 and 344 connect with upper and lower loading hoppers 346 and 348, respectively. An upper (auxiliary) compaction panel 350 and lower compaction panel 352 are provided as in other embodiments. Separate access doors or tailgate closures 354 and 356 are also provided as is a cab protector hood 358.

This invention has been described herein in considerable detail in order to comply with the Patent Statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

I claim:

1. A multi-compartment apparatus for collecting recyclable waste material comprising:

(a) a vehicle body mounted to a frame extending longitudinally between a forward and rearward end, the body enclosing a material receiving volume and a material storage volume;

(b) a generally horizontal partition in said body which divides the storage volume into separate upper and lower storage compartments;

(c) said material receiving volume including separation means defining a plurality of loading openings in the material receiving volume at the top of the body each such opening being in continuous communication with a corresponding one of said upper and lower storage compartments;

(d) a compacting system comprising a direct driven linear operating primary compacting mechanism associated with a corresponding one of said upper and lower compartments and a linear operating auxiliary compacting mechanism associated with the other of said upper and lower compartments mechanically linked to be driven by said primary compacting mechanism;

(e) compaction force controlling means including normally extended collapsible telescoping means comprising a plurality of slip-fitting members connected by a collapsible forcing member, said collapsible forcing member limiting the maximum compaction force exerted by said auxiliary compacting mechanism; and (f) linking means connecting said primary and said auxiliary compacting mechanisms.

2. The apparatus of claim 1, wherein at least one of said upper and lower storage compartments is further divided into two or more compartments by one or more spaced, substantially vertical panels.

3. The apparatus of claim 1, wherein said both upper and lower storage compartments are further divided into two or more compartments by one or more spaced, substantially vertical panels.

4. The apparatus of claim 3, wherein said plurality of lower storage compartments are provided by a corresponding plurality of primary compacting mechanisms and wherein said plurality of upper storage compartments are provided with a corresponding plurality of auxiliary compacting mechanisms, each mechanically linked to a corresponding one of said primary compacting mechanisms.

5. The apparatus of claim 3, wherein said vertical panels are telescoping panels.

6. The apparatus of claim 1 wherein:

(a) said collapsible telescoping means comprises a first end that moves directly in accordance with the movement of said primary compacting mechanism and a second end connected to move directly with said auxiliary compacting mechanism; and (b) said linking means comprises a generally vertically oriented member connecting said primary compacting mechanism with said first end of said collapsible telescoping means.

7. The apparatus of claim 6 wherein said collapsible telescoping means further comprises a plurality of slip-fitting hollow members connected by a compression spiring means such that said telescoping means normally remains fully extended thereby advancing said auxiliary compacting mechanism with said primary compacting mechanism until said auxiliary compacting mechanism meets sufficient resistance to cause compression of said spring.

8. The apparatus of claim 7, wherein the maximum compaction force exerted by said auxiliary compacting mechanism is adjustable.

9. The apparatus of claim 6 wherein said collapsible telescoping means further comprises a plurality of slip-fitting hollow members connected between the cylinder and rod end of a fluid cylinder, said cylinder being normally fully extended thereby advancing said auxiliary compacting mechanism with said primary compacting mechanism, said cylinder subject to retraction based on the resistance of said auxiliary compacting mechanism in relation to a predetermined operating pressure of said cylinder.

10. The apparatus of claim 9, wherein the maximum compaction force exerted by said auxiliary compacting mechanism is adjustable.

11. The apparatus of claim 6, wherein the maximum compaction force exerted by said auxiliary compacting mechanism is adjustable.

12. The apparatus of claim 11, wherein the maximum compaction force exerted by said auxiliary compacting mechanism is adjustable.

13. A multi-compartment apparatus for collecting, packing, hauling, and unloading recyclable material comprising:

(a) a hollow truck body mountable to a truck frame enclosing a receiving volume and a storage volume;

(b) a generally horizontal partition within the body which divides the storage volume into upper and lower storage compartments;

(c) a plurality of longitudinally-spaced loading openings at the top of the body, each opening being in continuous communication with either of said upper and lower storage compartments;

(d) separate tailgate means for separately closing said upper and lower compartments, each of said tailgate means being independently operable and accessible to access a corresponding one of said compartments;

(e) linear operating primary compacting mechanism associated with one of said upper and lower compartments for compacting generally compressible materials;

(f) linear operating auxiliary compacting mechanism associated with the other of said upper and lower compartments mechanically linked to said primary compacting mechanism for compacting materials in said second compartment; and (g) compaction force controlling means including normally extended collapsible telescoping means comprising a plurality of slip fitting members connected by a collapsible forcing member, said collapsible forcing member limiting the maximum compaction force exerted by said auxiliary compacting mechanism.

14. The apparatus of claim 13 wherein:

(a) said collapsible telescoping means comprises a first end that moves directly in accordance with the movement of said primary compacting mechanism and a second end connected to move directly with said auxiliary compacting mechanism; and (b) linking means comprising a generally vertically oriented member connecting said primary compacting mechanism with said first end of said collapsible telescoping means.

15. The apparatus of claim 14, wherein the maximum compaction force exerted by said auxiliary compacting mechanism is adjustable.

16. The apparatus of claim 13 wherein said collapsible telescoping means further comprises a plurality of slip-fitting hollow members connected by a compression spiring means such that said telescoping means remains fully extended thereby advancing said auxiliary compacting mechanism with said primary compacting mechanism until said auxiliary compacting mechanism meets sufficient resistance to cause compression of said spring.

17. The apparatus of claim 16 wherein said collapsible telescoping means further comprises a plurality of slip-fitting hollow members connected between the cylinder and rod end of a fluid cylinder, said cylinder being normally fully extended thereby advancing said auxiliary compacting mechanism with said primary compacting mechanism, said cylinder subject to retraction based on the resistance of said auxiliary compacting mechanism in relation to a predetermined operating pressure of said cylinder.

18. The apparatus of claim 17, wherein the maximum compaction force exerted by said auxiliary compacting mechanism is adjustable.

19. The apparatus of claim 16, wherein the maximum compaction force exerted by said auxiliary compacting mechanism is adjustable.

20. The apparatus of claim 13, wherein the maximum compaction force exerted by said auxiliary compacting mechanism is adjustable.

* * * * *